Sept. 11, 1951  A. E. McKEE  2,567,225
OXYGEN ADMINISTRATION
Filed April 14, 1944  6 Sheets-Sheet 2

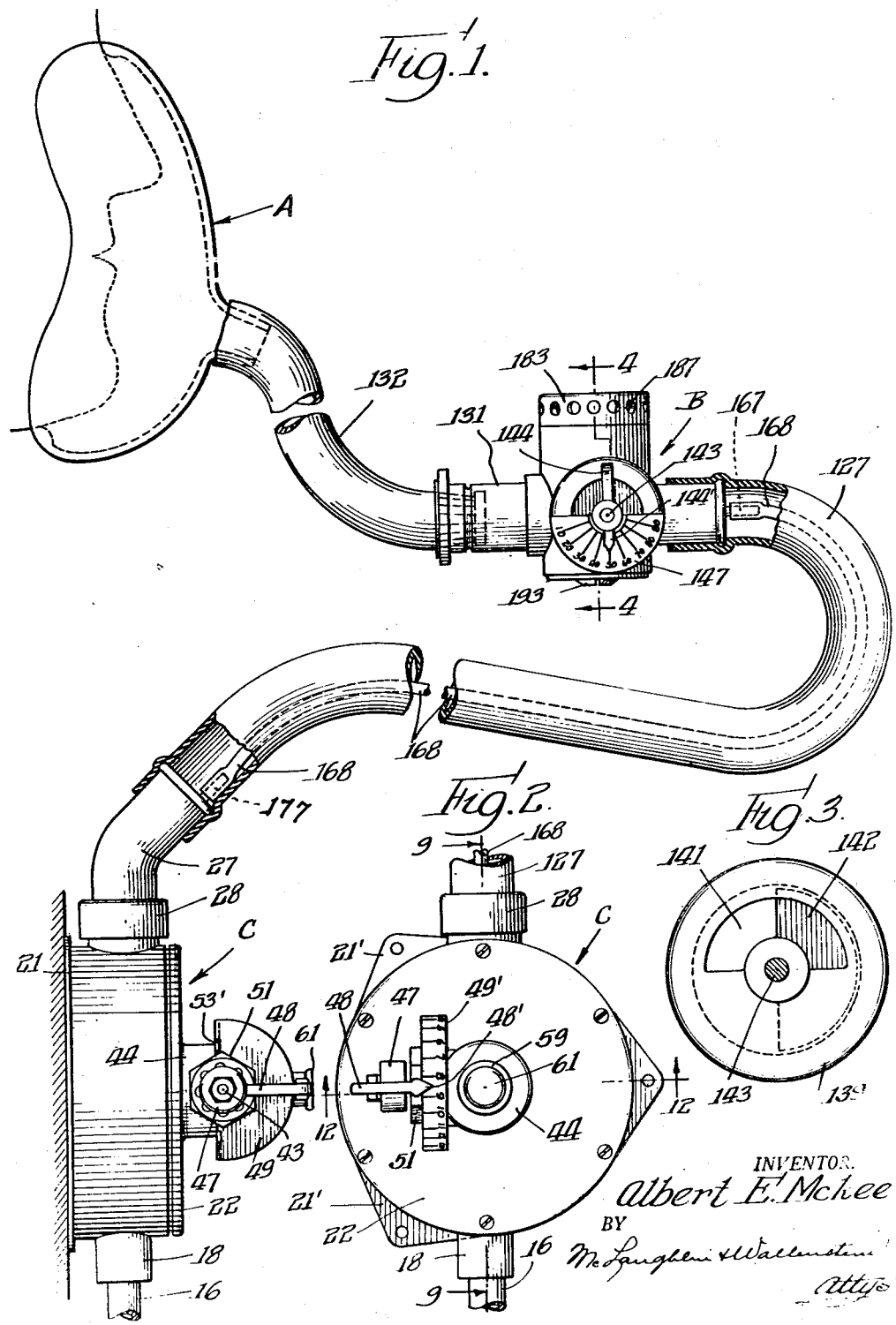

INVENTOR.
Albert E. McKee
BY
M Laughlin et Wallenstein
ATTYS

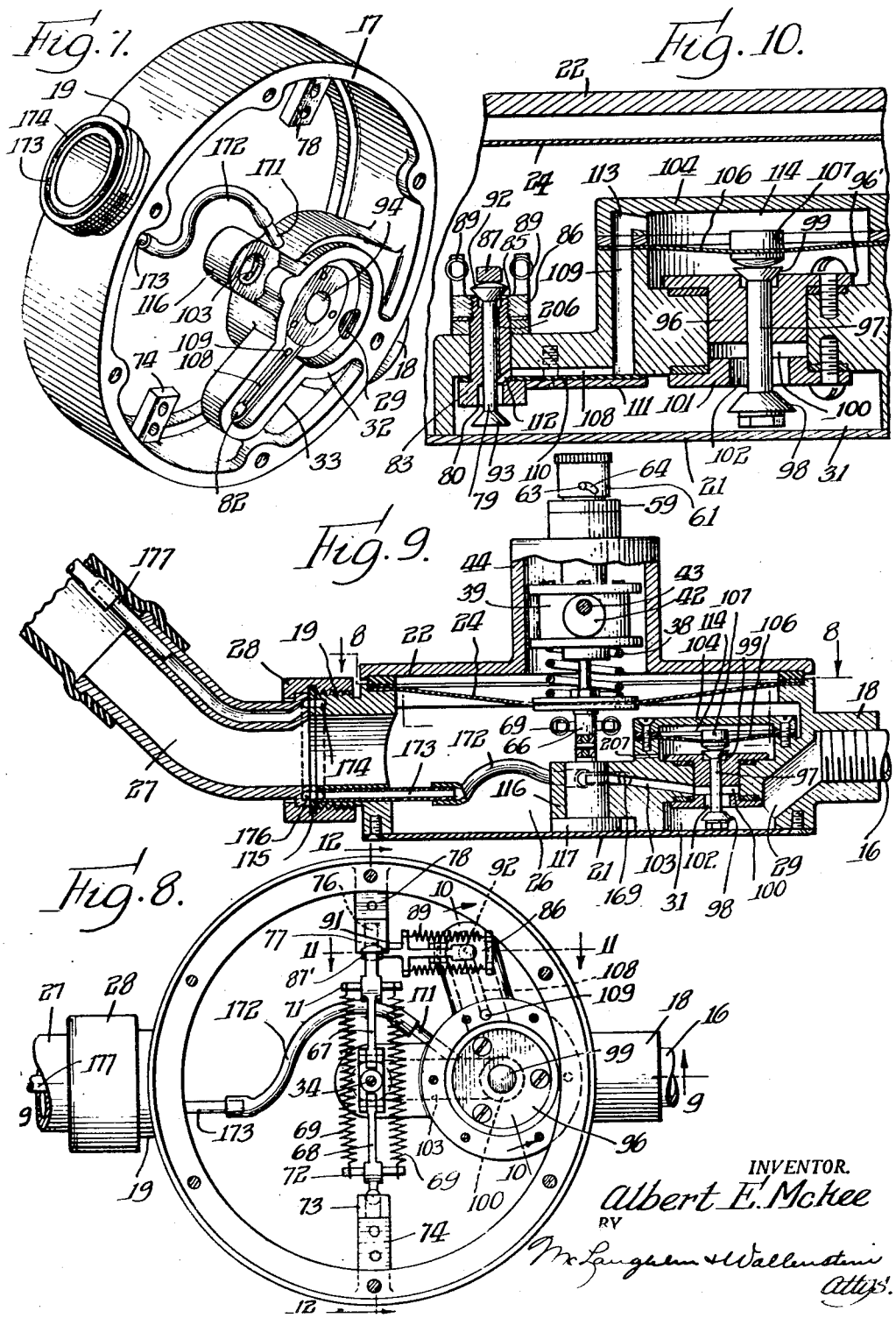

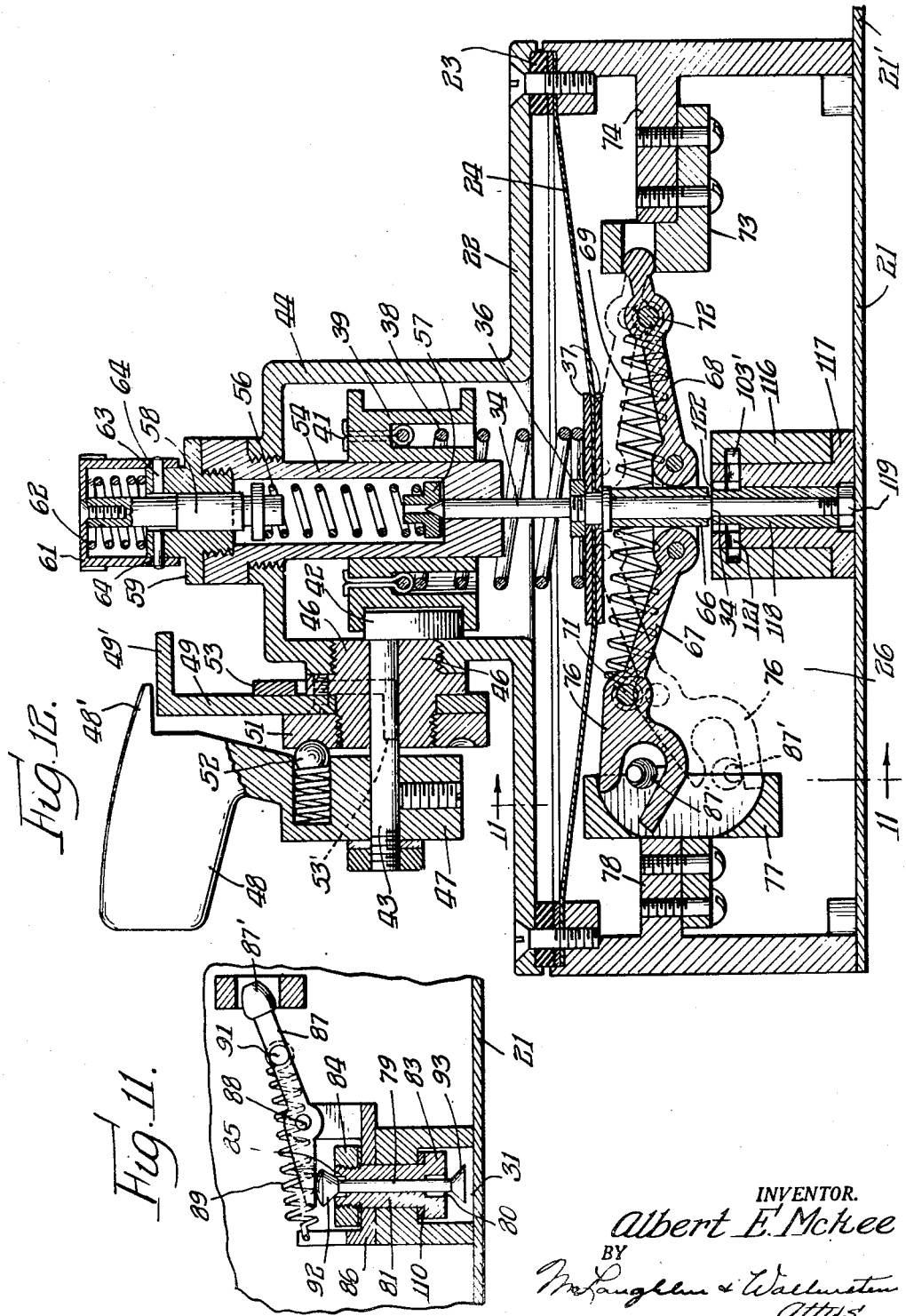

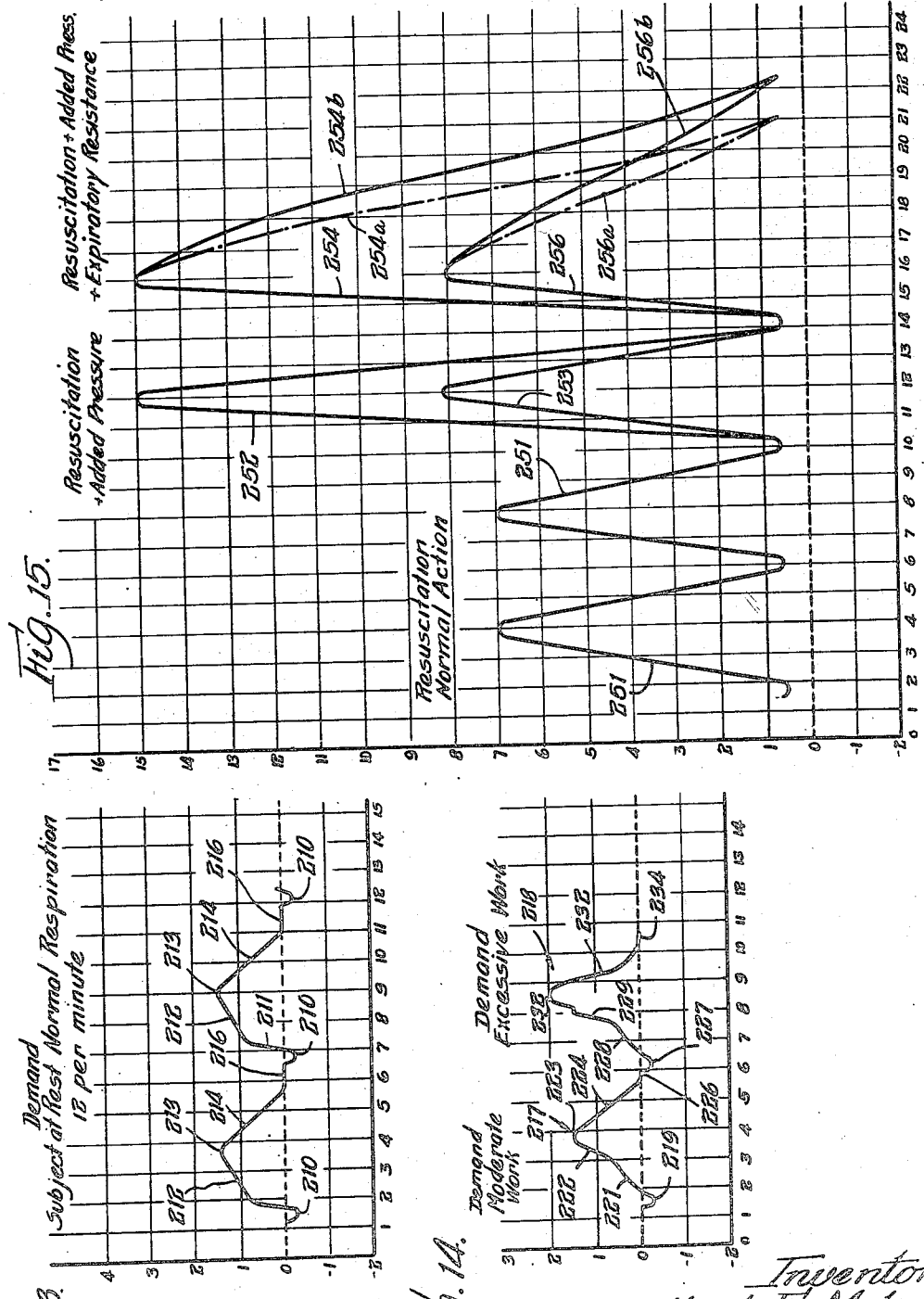

Patented Sept. 11, 1951

2,567,225

UNITED STATES PATENT OFFICE 2,567,225

OXYGEN ADMINISTRATION

Albert E. McKee, Chicago, Ill.

Application April 14, 1944, Serial No. 530,968

21 Claims. (Cl. 128—142)

My invention relates to administering oxygen and has for its object the provision of improved apparatus and improved methods for delivering oxygen in rarified atmospheres.

In prior application, Serial No. 498,973, filed August 17, 1943, in which application I am a joint applicant, there is disclosed an oxygen administration system comprising a combination of a demand regulator and an automatic regulator. The demand regulator is adapted to cause a flow of oxygen under pressure on the inspirational demand of the user, and the automatic regulator functions to deliver oxygen under pressure in rhythmic cycles independent of the conscious demand of the user, thereby having the general operating characteristics of a resuscitator. Reference is also made to my copending application Serial No. 537,803, filed May 29, 1944, which discloses related subject matter.

My present invention represents an improvement in several respects over the previously disclosed invention, notwithstanding the fact that some of the same general features and principles are involved. My present invention, however, provides for operation at continuous positive pressure, so that exhalation takes place against a positive back pressure, instead of through a restricted orifice to atmosphere, but additionally it provides for operation with intermittent oxygen pressure, either on demand or automatically, inhalation taking place while oxygen is being delivered under pressure, but exhalation taking place, when oxygen pressure is discontinued, through a restricted orifice to atmosphere. The oxygen is delivered on demand, substantially at ambient pressure, in which case the apparatus operates as a simple demand regulator; or at pressures above ambient pressure, in which event, the apparatus operates as a demand positive pressure regulator. My present invention also provides improved structural, control and operating characteristics. Such characteristics as well as other specific objects and features of the invention will be apparent from the specification which follows below.

The drawings disclose one embodiment of the invention adapted for use in aircraft. The invention is capable of modification and embodiment in other forms following the same general features.

In the drawings:

Fig. 1 is a composite view partly in section and partly in elevation and also partly broken away, showing an oxygen administering mask, an expiratory valve and a regulator, in the general positions which they may occupy during actual operation;

Fig. 2 is an elevational view of the regulator showing a dial used to indicate an adjustment thereof;

Fig. 3 is an elevational view of a portion of the expiratory valve, the figure comprising a sectional view taken on the line 3—3 of Fig. 4, looking in the direction of the arrows;

Figure 4:
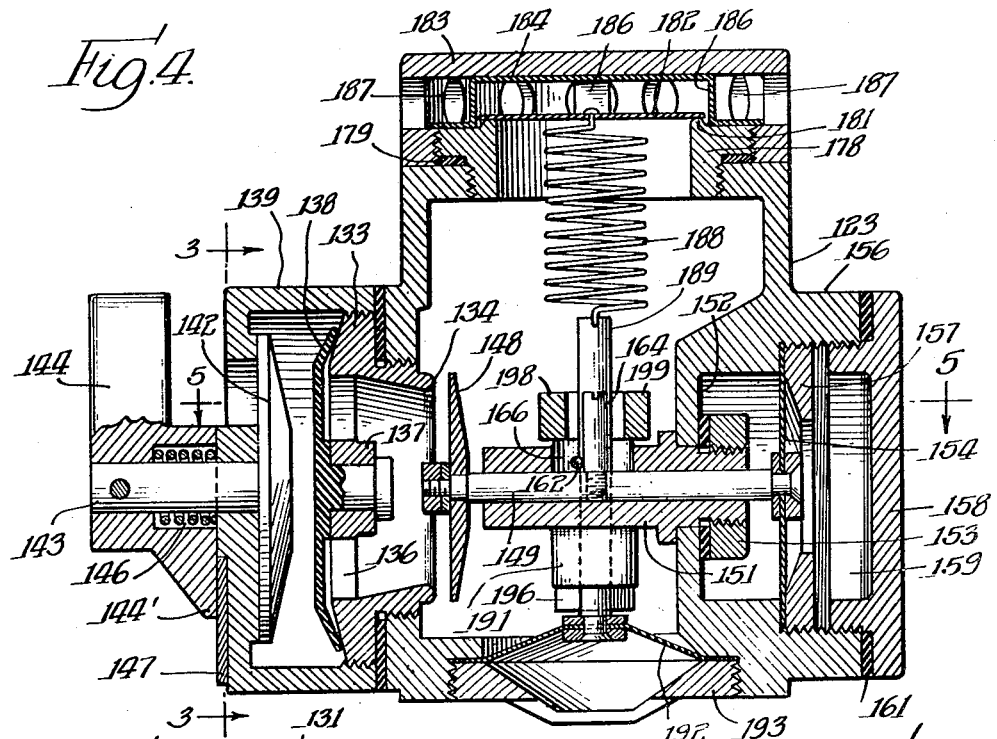
Fig. 4 is a vertical sectional view taken through the expiratory valve, the section being slightly irregular and taken on the line 4—4 of Fig. 1.
Figures 5, 6:
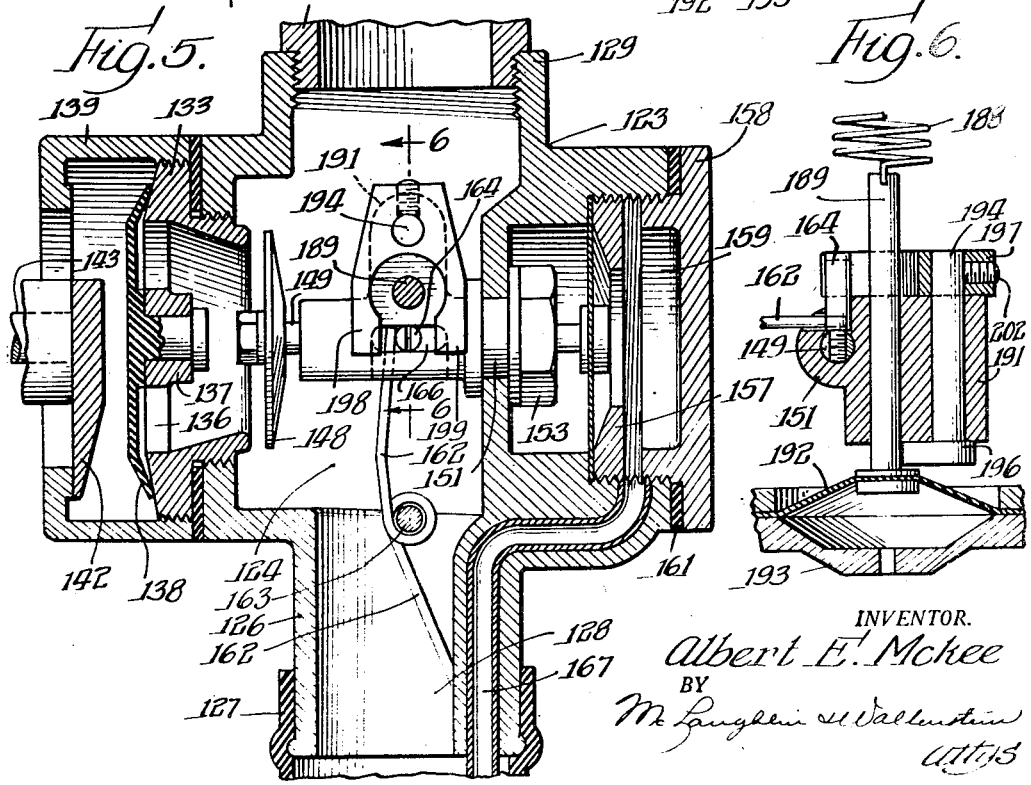
Fig. 5 is a transverse plan sectional view taken on the line 5—5 of Fig. 4, looking in the direction of the arrows.
Figure 16:
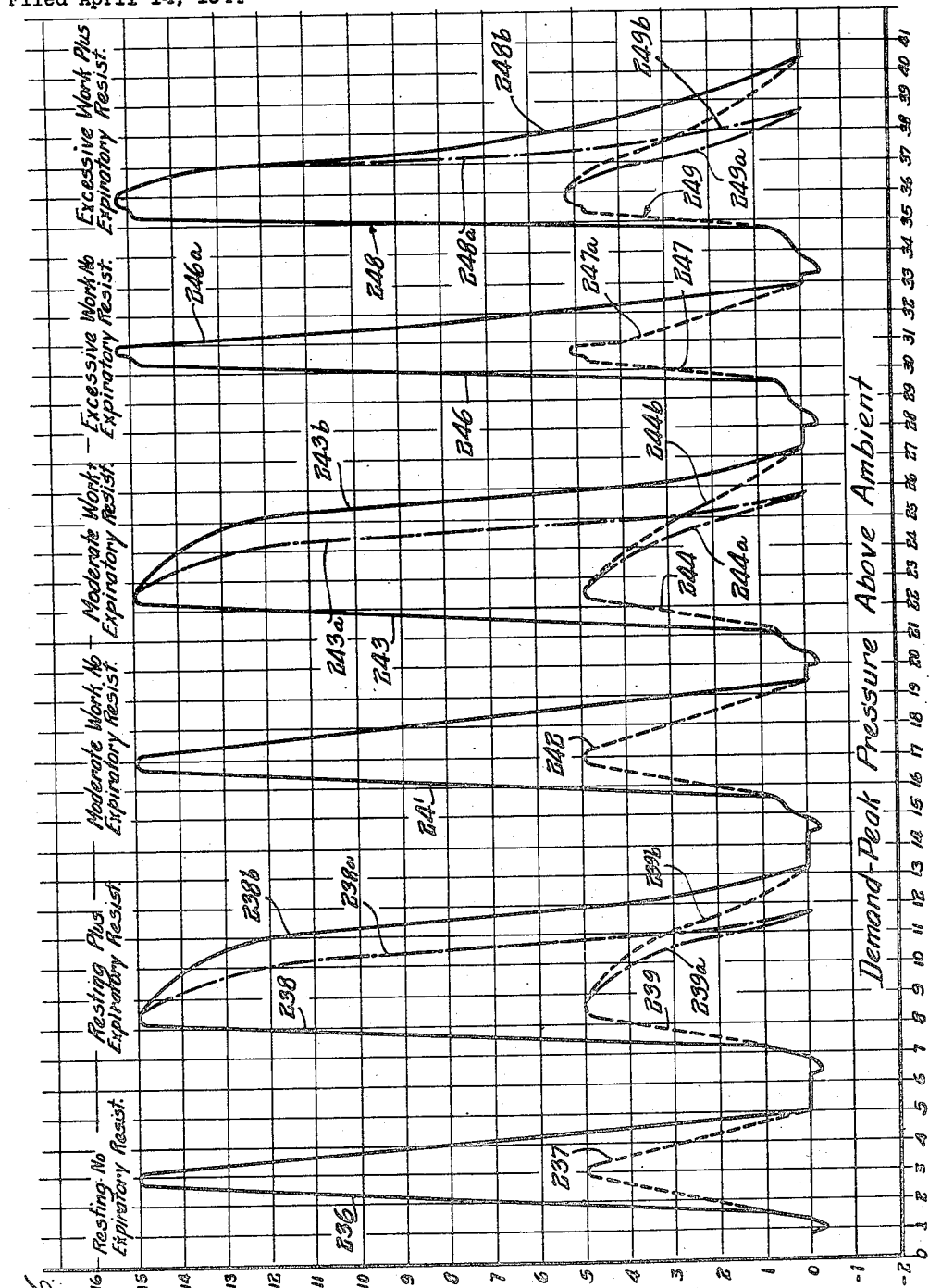

Fig. 6 is a fragmentary sectional view taken on the line 6—6 of Fig. 5. The figure may also be considered taken on the section line 6—6 of Fig. 4 and reference may be made to the section lines 6—6 on Figs. 4 and 5 for comparison and for a better understanding of the relationship of the parts comprising Fig. 6;

Fig. 7 is an isometric view of the regulator housing stripped of all of its parts except a portion of the expiratory valve control line;

Fig. 8 is a plan sectional view taken on the line 8—8 of Fig. 9, looking in the direction of the arrows, the figure comprising in essence a plan view with the diaphragm and some additional parts removed to show the construction of a double toggle arrangement which is not clearly brought out in other figures;

Fig. 9 is a transverse sectional view (a vertical section if taken on the line 9—9 of Fig. 2, as it might be) taken substantially along the line 9—9 of Fig. 8 with some of the parts being shown in elevation;

Fig. 10 is an enlarged fragmentary sectional view taken on the line 10—10 of Fig. 8, looking in the direction of the arrows;

Fig. 11 is an enlarged fragmentary sectional view taken on the line 11—11 of Fig. 8;

Fig. 12 is an enlarged sectional view taken on the line 12—12 of Fig. 8, looking in the direction of the arrows. The section may also be viewed as being taken along the line 12—12 of Fig. 2;

Fig. 13 is a graph showing the relationship of pressure and time in a breathing cycle when the device is operated on the simple demand principle and in which the subject is at rest and the respiration substantially normal;

Fig. 14 is a view similar to that of Fig. 13, except that the two curves show, respectively, the subject engaged in moderate work and in excessive work;

Fig. 15 shows a series of curves relating pressure to time in which the equipment is being operated automatically, generally in accordance with resuscitation procedure; and Fig. 16 is a series of curves showing various breathing cycles, with various adjustments of the apparatus, each, however, involving the use of pressure and initiation of the cycle on demand of the subject.

Before proceeding with the detailed description of the invention as illustrated in the drawings, I wish to point out that for convenience of illustration and to save space, Figs. 7 to 12, inclusive, are placed in different relative positions than the corresponding parts of Figs. 1 and 2, but that, generally, conventions have been followed in the relationship of Figs. 8 to 12, inclusive, to each other. In order to clarify the relationship of the parts, in certain instances section lines have been indicated in more than one figure. Neither the expiratory valve nor regulator depends for its operation on being placed in any particular position and while, for convenience, some of the parts may be thought of as comprising top or bottom, functionally the terms top or bottom should not be considered as of any significance.

Looking first at Fig. 1, I illustrate a face mask A connected by a tube to an expiratory valve B. A regulator C is connected to the expiratory valve B also by a tube, as will be described. The parts here occupy the relative positions which they may occupy when used for the administering of oxygen to personnel in combat airplanes. It will be noted that a fast operating connection is made between the tube leading to the face mask and the expiratory valve. Thus the pilot of an airplane or other user may have his own individual face mask, and the remaining portion of the equipment may be made available at his station in the airplane. The regulator C may, for example, be attached at one side at a sufficient level so that the control mechanism thereon can be seen and operated by the user. The expiratory valve B may be similarly mounted but, preferably, it occupies a position relatively close to the mask. It may, for example, be secured to the clothing of the user by means of a heavy clip at some place on the chest. My invention provides for unusual flexibility in the arrangement and positioning of the parts thereof. I wish to remind those skilled in the art that the apparatus need not be separated into separate units of the character illustrated, and also that the expression "expiratory valve" and "regulator" are for identification and description only. The embodiment of the invention in the particular form shown and described should not prevent a full understanding of the essential operations which the apparatus is meant to perform.

For convenience, I shall first describe the regulator C as appearing generally in Figs. 1 and 2 and in greater detail in Figs. 7 to 12, inclusive. This device is adapted to receive oxygen under pressure from a supply oxygen delivery pipe 16 and deliver it to the user rhythmically and in the amounts required. The regulator comprises a housing 17 which also acts as the main frame or support for apparatus contained therein, with a boss 18 for connecting the oxygen delivery pipe 16 to the housing, and a boss 19 through which a low pressure oxygen delivery tube is connected to the housing. One side of the housing is covered by a plate 21 having integral mounting lugs 21' used for securing the regulator in a desired position. The opposite side of the housing has secured thereto a housing cap 22 which also acts as a support for a portion of the apparatus comprising the regulator. A clamping ring 23 is disposed between the housing cap 22 and the housing 17 and clamps a diaphragm 24 in position to close off entirely one side of the housing. The plate 21, diaphragm 24 and a portion of the annular sides of the housing 17 together define a large chamber 26 which, through the boss 19, communicates with an oxygen outlet tube 27 held in position by an attaching nut 28. Supply oxygen entering the regulator from pipe 16 passes through a passageway 29 into a high pressure chamber 31. The high pressure chamber 31 is formed in part by an annulus 32 (see Fig. 7) and an annulus offset 33, the surfaces of which are engaged by plate 21 so as to close the chamber 31 from atmosphere, portions of the annulus 32 and offset 33 serving to separate chamber 31 from chamber 26. Oxygen is adapted to be delivered from the high pressure chamber 31 for expansion into the chamber 26 through passageways provided for the purpose; and special valves and control mechanism are provided for controlling the movement of oxygen through such passageways. For convenience, I shall employ the terms "supply oxygen" and "expanded oxygen" to identify, respectively, the oxygen delivered to the regulator C, and the oxygen delivered by mechanism comprising the regulator C to and beyond the chamber 26.

The essential control of oxygen delivery is by means of the diaphragm 24, and mechanism including an overcenter toggle switch operated in part thereby. A stem 34 extends through the center of the diaphragm and is threaded on one side to receive a nut 36 (see Fig. 12), a flange being provided on the side of the diaphragm opposite to the nut, and a pair of enlarged washers 37 being clamped between the flange and nut 36 and, in turn, clamping the diaphragm between them. The diaphragm stem 34 is thereby substantially rigidly supported at the center of the diaphragm while still maintaining the diaphragm in sealed condition to prevent loss of oxygen at the center thereof. Above the diaphragm and adapted under certain conditions to load the same, is a compression spring 38, the upper end of which spring extends into a lower annular recess of a compression controlling member 39 and is held in place by suitable means such as cotter pins 41 or the like. Oxygen pressure within the chamber 26 moves the diaphragm against the compression of spring 38 when such spring is in contact with the diaphragm so that the amount of oxygen pressure required to move the diaphragm against the force of spring 38 is determined by the position of the compression controlling member 39. This determines the peak pressure in the chamber 26, so that the compression spring 38 has the function of a peak oxygen pressure controlling spring.

To control the position of the compression controlling member 39, I provide an eccentric 42, carried on a shaft 43. The eccentric 42 engages in a side recess of the compression controlling member 39, so that by rotating shaft 43, the compression controlling member 39 is adapted to have its position (vertically looking at Fig. 12) controlled in a boss 44 on the housing cap 22. The shaft 43 is journalled in a plug 46 threaded in a reenforced aperture in the boss 44. A hub 47, integral with a handle 48, is secured to the projecting end of shaft 43 and pinned thereto.

A pointed portion 48' of the handle 48 is formed contiguous to an indicator 49' on an indicator plate 49. A nut 51 engages against the indicator plate 49 and is threaded on an extending portion of the plug 46. The face of the nut 51 is provided with a series of indentures or notches, in one of which a spring pressed ball 52, carried by the hub 47, is adapted to engage. The indentures or notches tend to hold the handle 48 in the position to which it has been adjusted between its extremes of movement. The extremes of movement are defined by stops 53', said stops comprising projecting ends of a stop plate 53 supported on the indicator plate 49. The stops 53' extend to a position at the sides of the nut 51, and beneath the indicator plate 49 as appears in Figs. 1 and 2.

Within the center of the compression controlling member 39 is a tubular guide member 54 functioning partly as a guide for said compression controlling member and also as a guide for the diaphragm stem 34. Tubular guide member 54 is threaded in the upper end of the boss 44 and its lower end is bored to receive the upper end of stem 34. A diaphragm return spring 56 in the guide member 54 has a spring follower 57 at the lower end thereof, the said follower being shaped to receive the upper conical tip of the diaphragm stem 34, so that the parts can center themselves and the compression of the diaphragm return spring 56 can be applied to the end of the stem 34 without any tendency toward canting or tilting. The upper end of diaphragm spring 56 bears against an enlarged portion of a spring compressing plunger 58 vertically reciprocable in a plug 59 screwed into the upper end of tubular guide member 54. A return spring control cap 61 is secured to the upper end of the plunger 58 and a cap retaining spring 62 is disposed between the lower surface of the cap, which also acts as a housing for the spring, and the upper end of plug 59. Pins 63 carried by the plug 59 extend into slots 64 provided in the control cap 61, the said slots 64 being so arranged that the control cap 61 may be held in either of two positions by spring 62. This positions the plunger 58 in such a manner as to cause greater or lesser compression of the diaphragm return spring 56 for a purpose which will later be explained.

Beneath the diaphragm 24, and partially within the chamber 26, is disposed the oxygen control valve equipment actuated in part by an overcenter type of toggle switch controlled by the position of the diaphragm. This diaphragm controlled toggle actuates a main oxygen control valve through the interposition of a relay valve actuated in turn by a relay toggle mechanism. In reading the explanation which follows, this general relationship should be borne in mind.

Surrounding that portion of the diaphragm stem 34 immediately below the diaphragm 24 is a toggle bracket 66 to which toggle arms 67 and 68 are pivoted, as shown particularly in Figs. 8 and 12. Toggle springs 69 are tensioned between pins 71 and 72 extending through the toggle arms 67 and 68, respectively. Arm 68 has a ball shaped terminus extending into a recess in a positioning bracket 73 carried by a projection 74 from the housing 17. Arm 67 has a bifurcated end 76 guided in a slot in a bracket 77 carried by a projection 78 from the housing 17. The toggle switch comprising toggle bracket 66, toggle arms 67 and 68 and toggle springs 69 actuates a relay toggle and a relay valve, as previously mentioned, and the assembly comprising such relay valve and relay toggle will now be described.

Near the end of that portion of the chamber 31 defined by the annulus offset 33 is a relay valve 79, the stem of which is disposed in a valve stem guide 81 mounted in an opening 82 (see Fig. 7) extending between the chambers 26 and 31. The valve stem guide 81 has an enlarged head portion 83 (see Figs. 10 and 11) engaging the web surrounding the opening 82, and the other end of the valve stem guide 81 is threaded to receive a nut 84. The valve stem guide and nut 84 are provided with valve seats 80 and 85, respectively, and the material around the seats is cut away to provide enlarged passageways between such seats and the valve stem 79. Between the offset 33 (the opposite side to that seen in Fig. 7) and the nut 84, is disposed a relay toggle bracket 86, the nut 84, therefore, serving not only to hold the valve stem guide in proper position but also to support the relay toggle bracket 86. A relay toggle arm 87 is pivoted at 88, intermediate its ends, to the relay toggle bracket 86. Springs 89 are tensioned between an upstanding portion of the relay toggle bracket 86 and a transverse portion 91 of the relay toggle arm 87. One end 87' of the relay toggle arm 87 is disposed in operable engagement within the bifurcated end 76 of the toggle arm 67 and the other end of the relay toggle arm 87 is adapted to engage a valve head 92 of the valve 79. A valve head 93 is disposed at the opposite end of the valve 79, and the contiguous portion of the valve stem guide 81 and nut 84, in each instance, is finished to form a seat for valve faces of the valve heads 92 and 93. An understanding of the function of the valve 79 and the manner of operation of the main and relay toggles must await a description of the structure of the main valve, the expansion valve, and the several ports and passageways functionally associated therewith.

The details of the main valve are shown particularly in Figs. 9 and 10, but reference should also be had to the remaining figures, particularly Figs. 7 and 8, for a full understanding of the relation of the main valve to other parts of the regulator. The annulus 32 is provided with a central opening 94 (Fig. 7) in which is disposed a main valve stem guide 96 (Fig. 10). A main valve stem 97 has a main valve 98 secured to one end thereof and a head 99 at the other end comprising an upper valve. The valve stem guide 96 has an upper flange portion 96' through which suitable machine screws or other fastening means extend to support the main valve stem guide in position, and also to form a seal for the upper valve 99. A main valve seat member 101 is secured in position in the opening 94 so as to form a seat for the main valve 98. The valve stem guide 96 and main valve seat member 101 are spaced from each other to form a chamber 100, and the main valve seat member is recessed to form a passageway 102 around the valve stem whereby, when the main valve is opened, to place the chamber 31 in communication with chamber 100 and a passageway 103, one end of which communicates with chamber 100.

The opposite side of the annulus to that seen in full in Fig. 7 is provided with a cap 104 which functions as a retainer for a main valve diaphragm 106 (see Figs. 9 and 10). The center of the diaphragm 106 substantially coincides with the axis of valve stem 97. A diaphragm load bearing member 107, carried at the center of the main valve diaphragm, is adapted to engage the end of valve stem 97 whereby, in a manner later to be described, to force the main valve 98 from its seat.

A slot 108 is provided in the offset 33 between the opening 82 and a passageway 109 formed by boring a hole at the end of the slot 108 and through the side portion of the annulus 32. A gasket 110 held in place in part by a plate 111 secured over the slot 108 between the opening 82 and the passageway 109 produces with the slot 108 a passageway running between these two points. (For convenience, both the slot and passageway are indicated by the reference character 108.) The gasket 110 is also held in position by the head portion 83 of the relay valve stem guide, and a short passageway 112 across such head portion 83 terminating below said gasket 110 and communicating with both the passageway 108 and the passageway between the valve seat 80 and valve stem guide 79 is adapted to place the passageway 109 in communication with the high pressure oxygen chamber 31. The cap 104 is provided with a small angular passageway 113 aligned with the passageway 109, and, the diaphragm being provided with an opening at this point, the passageway 109 is placed in communication with a main valve expansion chamber 114 between the diaphragm 106 and the cap 104.

In addition to controlling some of the parts of the expiratory valve B (as will be later explained), the main function of the valve mechanism heretofore described is to deliver oxygen from the chamber 31 to the chamber 26 through a controlled expansion orifice. This is done through an expansion valve associated with the diaphragm stem 34 disposed substantially centrally of the housing 17, and integral with the annulus 32 is an annular expansion valve housing 116. The expansion valve housing 116 has an inserted expansion valve seat 117 in which a valve 118 is reciprocable, being retained on the bottom end of stem 34 by a nut 119. The expansion valve seat insert and tubular guide member 54 are vertically aligned so that the diaphragm stem 34 can be freely vertically reciprocable in both members without side strain, and without cramping the diaphragm 24. The passageway 103 terminates in an enlarged portion 103' extending part way around the inner surface of the expansion valve housing 116. The valve seat 117 is provided with a plurality of radial openings 121, placed 120 degrees apart, communicating with an annular expansion orifice 122. The annular expansion orifice 122, it will be seen by an inspection of Fig. 12, is formed between an upper portion of the expansion valve 118 of restricted cross section and an upper portion (above the radial openings 121) of the valve seat 117 made slightly larger than the remaining portion thereof. Both the valve 118 and expansion valve seat 117 are finished with sharp shoulders and the valve 118 fits snugly within the valve seat 117 at all portions thereof except at the annular expansion orifice 122.

It will be recalled that the function of the apparatus of my present invention is to deliver oxygen at a controlled peak pressure on demand of the user (on either the simple demand principle, or the demand positive pressure principle), oxygen delivery being discontinued when the peak pressure is reached, and the user permitted to exhale against a restricted orifice; to provide for automatic operation on the resuscitator principle; and also to provide for continuous positive pressure of oxygen on demand of the user with expiration against a fixed positive back pressure. These several methods of operation are required to be capable of regulation in accordance with other requirements, for example, requirements resulting from a change in ambient pressure and capable of either manual or automatic control by aneroids, solenoids, and the like. Before further describing and explaining the operation of the regulator C, I wish to explain the construction of the expiratory valve B, it being understood that the terms "regulator" and "expiratory valve" are employed for identification and to facilitate description rather than in any rigid sense to mean that the parts of the apparatus are necessarily separated, constructed and/or operated in the identical manner shown.

The expiratory valve B comprises a six sided housing 123 containing a main chamber 124. A boss 126 is shaped to receive an oxygen delivery tube 127, the other end of the oxygen delivery tube being connected to the regulator outlet tube 27. Expanded oxygen is, therefore, delivered to the chamber 124 through passageway 128 in the boss 126. Opposite boss 126 is a boss 129 in which a tube 131 is threaded, the tube 131 being shaped to receive a coupling member of a suitable type carried by a tube 132 extending to the face mask A. The length of tube 132 may vary. It may be sectioned, or various adjustments may be made to control its length as will be explained. The tube 131 comprises an expiratory valve expanded oxygen outlet tube for the delivery of expanded oxygen through the flexible tube 132 to the mask; and, since breathing takes place through the expiratory valve, the tubes 131 and 132 also comprise exhalation tubes during the exhalation portion of the breathing cycle. It is preferred that the connection between the flexible tube 132 and the tube 131 be quickly made and quickly detachable while at the same time preventing loss of oxygen at the connection. Devices generally similar to that indicated in the drawing are known and may be used for the purpose.

One of the functions of the expiratory valve B is to close to atmosphere the oxygen delivery line running from the regulator C to the mask at the time oxygen is being delivered to the user and to open the tube 132 to atmosphere to permit exhalation when oxygen delivery has been discontinued. The expiratory valve B is constructed to provide an exhalation orifice of a restricted and controlled type, in part, and as to some of its characteristics, under the control of the user but predominantly controlled by the regulator C. The portion of the expiratory valve B providing the restricted exhalation orifice will first be described; and then I shall explain the manner in which operation of the regulator C controls operation of the expiratory valve.

Threaded in an opening on the housing 123 is a valve seat member 133 shaped to provide a seat 134 just within the chamber 124. Supported at the center of the valve seat member 133 by radial arms 136 is a boss 137, and this boss 137 carries the stem of a flutter valve 138 formed of semi-soft rubber or the like and bearing against a regular exterior portion of the valve seat member 133. An adjustable exhalator valve cover 139 is threaded on the exterior of valve seat member 133 and is provided with a semi-circular exhalator valve opening 141 (see Fig. 3). The exhalator valve opening is adapted to be closed by semi-circular exhalator adjustment valve 142, an integral shaft 143 of which extends through the side wall of the exhalator valve cover 139 and has a regulator handle 144 pinned thereto. The regulator handle 144 is apertured to receive a spring 146 which is placed under compression and bears against the outside surface of the exhalator valve cover 139 and holds the adjustment valve 142 against the smooth inside face surrounding the exhalator valve opening 141. A dial plate 147, secured in a recess on the outside surface of the exhalator valve cover 139, and a pointer 144', integral with the regulator handle, extends partly over the dial plate 147 so as to indicate the adjustment of the exhalator adjustment valve 142.

The flutter valve and exhalator adjustment valve are auxiliary to the main valve for closing or opening the chamber 124 to atmosphere. The main valve comprises a valve 148 secured on a stem 149 reciprocable in a valve stem guide 151. The valve stem guide 151 is held in a web portion 152 of the housing 123 by a nut 153, a suitable gasket or washer being provided as indicated. A diaphragm 154 has the end of the valve stem 149 secured to its center and is held against a shoulder within a boss 156 by a diaphragm retaining nut 157. A cover nut 158 closes a diaphragm chamber 159 within the boss 156, a gasket 161 or other suitable packing being provided to prevent leakage from or to diaphragm chamber 159. A spring 162 normally holds the assembly comprising the valve 148, stem 149 and diaphragm 154 in the position shown in Fig. 4, with the valve 148 spaced from the seat 134. This spring 162 has a central looped section extending around a pin 163, projecting from the inner wall of the housing 123. One end of the spring 162 engages the inside wall of the boss 126 and the other end engages against a cam operating pin 164, engaging in a tapped radial hole in the valve stem 149. It will be noted that valve stem guide 151 is provided with a slotted recess 166 (see particularly Fig. 5) extending to the outer surface of the stem 149. The end of the spring 162 extends into this slot and the cam operating pin 164 is also reciprocable in the slot in a manner and for a purpose to be described.

The assembly comprising the valve stem guide 149, valve 148 and diaphragm 154 is held by the spring 162 in a position to maintain the expiratory valve 148 open, but is moved in a direction to cause the valve 148 to engage the seat 134 when gas pressure within the diaphragm chamber 159 causes the diaphragm to be expanded. To understand the manner in which gas under pressure is delivered to the diaphragm chamber 159, reference will be made to parts of the expiratory valve B and also to parts of the regulator C.

Extending through the material comprising the boss 126 is a tube 167 comprising a part of a high pressure control line leading from the oxygen source to diaphragm chamber 159. The tube 167 is suitably introduced during the production of the casting comprising the housing 123 and boss 126, and is so arranged that one tip thereof extends out to receive a small flexible tube 168 (see Fig. 1) disposed within the larger tube 127 and the other end of which is in communication with the diaphragm chamber 159. The tube 168 leads to the regulator C and oxygen under pressure is delivered thereto at the same time that oxygen is delivered to the mask of the user. I shall now refer to Figs. 7 to 10, inclusive, to explain the features of the regulator by means of which this is accomplished.

A passageway 169 communicates with passageway 103 through a section of the metal comprising the connection between the annulus 32 and expansion valve housing 116. A connecting tube 171 is threaded into that end of the passageway 169 which leads to chamber 26 (see Fig. 7). A flexible connecting tube 172, however, extends from the projecting end of tube 171 to a tube 173 extending through a portion of the metal comprising the boss 19. The tube 173 communicates with an annular recess 174 formed on the end of boss 19 (see Figs. 7 and 9). The regulator outlet tube 27 is also provided with an end annular recess 176 and a tube 177 extending through the metal comprising the said regulator outlet tube 27, communicates with the annular recess 176. An apertured gasket 175, as shown, provides a communication between the annular recesses 174 and 176. The lower end of the flexible tube 168 is secured to the connecting tube 177. Thus through the connections shown and described, the expiratory valve control line is made to interconnect the chamber 31 (through the passageway 103) and the diaphragm chamber 159. When oxygen under pressure is delivered from the chamber 31 to the passageway 103, therefore, the said pressure is communicated immediately to the diaphragm chamber 159. It will be noted that the annular recesses 174 and 176 align themselves (through the apertured gasket 175) when the regulator expanded oxygen outlet tube 27 is applied in position, so that regardless of the manner in which the regulator outlet tube 27 may be rotated with respect to the boss 19, the connecting tube 173 will always be placed in communication with the connecting tube 177, and the expiratory valve control line will always be connected.

In order to provide for additional exhalation capacity, and to secure other functions which will be described, I have also provided in the expiratory valve B, an additional valve, which, for identification, I shall term an auxiliary valve. The operation of the auxiliary valve will be described later, but now I shall try to make clear the structural features thereof.

Secured in a threaded aperture on one face of the expiratory valve housing 123 is an auxiliary valve seat member 178, a sealing gasket 179 being provided between an annular flange portion of the auxiliary valve seat member 178 and a contiguous portion of the housing. A portion of the auxiliary valve seat member 178 is raised and finished to provide an auxiliary valve seat 181 against which an auxiliary valve 182 is adapted to seat. An auxiliary valve seat cover 183 is screwed to a threaded outer portion of the auxiliary valve seat member 178 and is so dimensioned as to form, with the contiguous portion of the housing 123, a smooth exterior surface, as shown particularly in Fig. 1. An auxiliary valve guide 184 is disposed between the auxiliary valve cover 183 and the valve seat member 178, the valve guide having a plurality of spaced legs 186 so disposed as to guide the auxiliary valve but permitting oxygen or other gas passing between the valve 182 and its seat to escape to the interior of the auxiliary valve seat cover 183. A plurality of edge openings 187 are provided in the cover 183 to permit the escaping gas to exhaust to atmosphere.

The auxiliary valve 182 is held against its seat by a spring 188, one end of which is secured to the center of the auxiliary valve 182 and the other end of which is secured to the end of an auxiliary valve stem 189. The auxiliary valve stem 189 is reciprocally supported in an offset portion 191 of the valve stem guide 151. The opposite end of the auxiliary valve stem guide 189 is secured to the center of diaphragm 192 secured in one face of the housing 123 by an auxiliary valve diaphragm cover 193, the exterior of which is threaded to engage in internal threads provided on the housing 123. The auxiliary valve diaphragm cover 193 is apertured to permit ambient atmospheric pressures to be effective against the exterior face of diaphragm 192. Extending parallel with the auxiliary valve stem 189 is a cam shaft 194 to which is secured a cam 196. The cam shaft 194 and cam 196 may be integral, but the cam 196 comprises essentially a disc disposed eccentrically on the shaft 194. A cam arm 197 has a pair of integral fingers 198 and 199, disposed adjacent the valve stem guide 151 but on opposite sides of the cam operating pin 164 secured in the valve stem 149. The center open portion of the cam arm between the fingers 198 and 199 is enlarged so as to permit free movement of the cam arm without having it come in contact with the auxiliary valve stem 189. A set screw 202 extends through the cam arm 197 and engages the cam shaft 194 so that movement of the cam arm 197 caused by the cam operating pin 164 striking the fingers 198 and 199 will cause the cam shaft 194 to rock, and rocking of the cam shaft 194 will have the effect of either disengaging the cam 196 from the auxiliary valve stem 189 or engaging the said valve stem for a purpose and in a manner to be described.

Before describing the various controls, features, and the manner of operating in accordance with different principles or requirements, I shall first describe merely the functioning of the apparatus comprising the regulator C and valve B. In describing the operation, the adjustment of spring 38 will be disregarded, and it will be assumed that the parts are in the position which they occupy when oxygen is first being delivered through the chamber 26 up through the outlet tube 27 and eventually to the mask, that is to say, the toggle switch has just operated to open the main valve, but oxygen has not entered sufficiently to build up a pressure beyond chamber 31. The oxygen is delivered through the pipe 16 from a suitable source of supply and at suitable pressure controlled by means known in the art and with which this invention is not concerned. With the parts in the position shown in the drawings oxygen passes through the passageway 29 into the chamber 31, through the passageway 102 into passageway 103, and out through the annular expansion orifice 122, and expands into the large chamber 26. From here, the expanded oxygen is delivered through the tube system and the expiratory valve device B into the mask A. At the same time that expanded oxygen is delivered to the chamber 26, oxygen under pressure is also delivered through the passageway 169 and through the expiratory valve control line including the tubes 172, 173, 177, 168, and 167 into the diaphragm chamber 159. The oxygen entering the chamber 159 actuates the diaphragm 154 to move the diaphragm valve assembly, including valve stem 149, thus to engage the valve 148 against its seat 134. This prevents loss of oxygen through the expiratory valve, and oxygen thereupon expands into the large chamber 26 and flows through the oxygen delivery line 127, through chamber 124, through tube 132 and into the mask A. Oxygen is received by the regulator C at a relatively high pressure, at least of the order of eight pounds per square inch and up to twenty-five pounds per square inch or even more depending upon the specific construction of the apparatus. Before the oxygen starts to expand into the chamber 26 the pressure in this chamber is relatively low, for example, on the order of ambient pressure. As soon as the pressure starts to build up slightly in chamber 26, however, the diaphragm 24 is lifted slightly, carrying with it the expansion valve 118. Raising the expansion valve 118 has the effect of partially closing the expansion orifice 122, since the shoulder on the expansion valve will then be brought up past the radial openings 121, and the greater diameter portion thereof will then define the expansion orifice. This forms a smaller cross-section annular orifice, and the rate at which oxygen is permitted to enter the chamber 26 is greatly reduced. The user of the device continues to inhale so that oxygen enters the chamber 26 through the expansion orifice at only a slightly greater rate than that at which it is taken into the lungs of the user. It should be remembered that the oxygen is in motion and cannot be said to be at a fixed definite pressure during this portion of the cycle. There is a gradual slight rise in pressure, however, until the user has ceased to inhale and at this point the oxygen pressure rises sufficiently to over-balance the total force tending to keep the diaphragm in a lower position, including that of springs 69. These forces may involve atmosphere pressure above the diaphragm, the spring pressure of compression spring 38 (if in engagement with the diaphragm), the tension of toggle springs 69, and the pressure of spring 56.

When a pressure has been built up in the chamber 26 sufficient to overcome the forces at any one time resisting the upward movement of the diaphragm 24, the toggle bracket 66 is carried upwardly a sufficient distance so that the center line of springs 69 is below the pivot points between the arms 67 and 68 and the toggle bracket. The toggle acts like an overcenter switch mechanism and when the toggle bracket 66 has been raised a sufficient distance to cause the springs 69 to snap the arms about their pivots in the opposite direction, the arms are carried to the position indicated in dotted lines in Fig. 12. When this movement of the toggle arms occurs, the bifurcated end 76 of the arm 67 rotates the relay toggle arm 87 about its pivot 88 (Fig. 11) and disengages the tail portion of the arm 87 from the head 92 of the valve 79. It will be noted that there is considerable play between the end 87' of the relay toggle arm 87 and the bifurcations comprising the bifurcated end 76 of the main toggle arm 67. Thus incipient movement of the toggle arm 67 prior to the time that the toggle arm snaps over center from one extreme position to the other is not sufficient to actuate the arm 87; but when the arm 87 is moved, it also can move with a snap or overcenter action, and its end 87' can advance further than it is carried by the arm 67. The full and dotted line positions of Fig. 12 will illustrate this feature. The construction is such that both toggles have independent snap movement notwithstanding the fact that one is actuated by the other.

Still disregarding the principle on which the apparatus is being operated, let us examine the normal effect of actuation of the toggle switch mechanism on attainment of the peak pressure as described hereinabove. When the head 92 of the valve 79 is released, the pressure in chamber 31 being greater than the pressure in chamber 26, the valve 79 is snapped upwardly (when in the position shown in Figs. 10 and 11) and the valve face of the head 93 engages the seat 80 while the valve face of the head 92 is released from its seat 85. I have found that oxygen pressure alone is sufficient to cause a return movement of the valve 79 but those skilled in the art will understand that I may utilize any suitable force to cause a return movement such as a spring if deemed necessary. When valve 93 is closed to cut off flow of oxygen to the main valve diaphragm chamber 114, high pressure oxygen bleeds from this chamber past valve 92, as will be explained. The stem of the relay valve 79 may be formed loose enough in the valve stem guide 81 to permit such bleeding action; but to clarify the action obtained, I show a relatively small opening 206 in the valve stem guide extending from the valve seat 85 to the passageway 112. When the valve 79 has been operated, therefore, the high pressure in the diaphragm expansion chamber 114 is released through passageways 113, 109, 108, 112 and 206 to the relatively lower pressure chamber 26. The pressure below the diaphragm 106 is at all times substantially static due to a relatively small passageway 207 running from the chamber below the diaphragm into the chamber 26 and also due to the fact that when main valve 98 is open, valve 99 is closed, so that such oxygen as might otherwise bleed past the stem 97 will be prevented from entering the chamber below the diaphragm. When pressure is released above the diaphragm 114, therefore, the main valve comprising the stem 97 and valve heads 98 and 99 is caused to flip upwardly, again due to the relatively greater pressure in the chamber 31 than above the valve 99. In the case of this main valve I have also found in actual practice that oxygen pressure alone in general is adequate to actuate the valve; but that separate valve returning force such as a spring or other equivalent of gas pressure may be employed. As soon as the valve head 98 engages its seat, the passageway 102 is taken out of communication with passageway 31 and passageway 103 is still open to chamber 26 through the annular expansion orifice 122 (see Fig. 12). Passageway 169 with which the expiratory valve control line is connected also is connected and disconnected from the high pressure chamber 31. This permits an immediate lowering of pressure in the diaphragm chamber 159 and unseating of valve 148 from valve seat 134. The entire expanded oxygen delivery system beyond the main valve 98, including chamber 26, the mask A and interconnecting tubes 127 and 132, may, therefore, be opened to atmospheric pressure by the opening of the expiratory valve. For the moment, I shall not discuss the details of the expiratory cycle, it being sufficient for the present to point out merely the parts and operations involved. The actuation of the toggle switch and main and relay valves, as described, takes place so rapidly as to be almost instantaneous, notwithstanding the fact that there is a flow of oxygen until a peak pressure is attained, and a shutting off of oxygen during the expiratory portion of the cycle after such pressure is attained. The inspiration portion of the cycle is initiated when the several forces which are involved at any one time (depending upon principle of operation) move the diaphragm and toggle mechanism to a position to open the relay and main valves. I shall discuss this operation later in connection with a description of the several methods of operation which may be utilized.

In order to understand details of operation, those skilled in the art should have an explanation of some of the terminology used herein. By a simple demand regulator I mean a regulator in which the oxygen is delivered on demand of the user at substantially ambient pressure, or at a pressure only sufficiently higher than ambient to cause the oxygen to flow to the mask; and wherein oxygen delivery is discontinued when the user ceases to inhale, and exhalation takes place to atmosphere through a restricted orifice. By the expression demand positive pressure regulator I mean a regulator wherein oxygen is delivered when demanded by the user, but flows or builds up to a pressure above ambient pressures. I employ the term positive pressure generally herein to mean a pressure above ambient, and the term negative to mean a pressure below ambient. Thus the simple demand regulator differs from a demand positive pressure regulator, principally in the peak oxygen pressure attained at the end of the inhalation portion of the cycle. By the term peak pressure I mean the relative pressure at which oxygen delivery to chamber 26 is discontinued. The apparatus of my present invention may be operated automatically—that is to say—on the principle of the resuscitator. When so operated oxygen is delivered until the peak pressure is reached, as determined by adjustment, regardless of the demand of the user, and both oxygen delivery and discontinuance thereof are independent of the demand of the user. Exhalation takes place to atmosphere through a restricted orifice. The apparatus of my invention may also be operated as a continuous positive pressure regulator. By this I mean that the oxygen is delivered under pressure and continues to flow so long as the user inhales the same, but that exhalation takes place against a positive back pressure.

When the apparatus is operated as a simple demand regulator, the spring 38 is entirely out of contact with the diaphragm, and the peak pressure at the end of the inhalation cycle is at a minimum. When the flow of oxygen has been discontinued and the valve 148 opened, the user exhales against a restricted orifice determined by the adjustment of valve 142.

The pressure within the chamber 26 relatively quickly returns to ambient pressure from the relatively slight positive pressure which had been attained therein and which was sufficient to move the diaphragm 24 to its uppermost position. There is a slight loading of the diaphragm by the spring 56, but the spring 56 alone is not sufficient to overcome the tension of springs 69 when the mechanism is adjusted for operation as a simple demand regulator. Because of this relation of springs 56 and 69, the toggle mechanism will be maintained in a position to close valve 98 throughout the exhalation portion of the cycle and regardless of lowering of pressure within the chamber 26. In other words, if the user of the apparatus should, for any reason, completely exhale and then hold his breath, the toggle switch would not operate, even though the expiratory valve continued open. When the user of the apparatus demands oxygen, however, by the act of starting to inhale, he causes a slight lowering of the pressure within the chamber 26; that is to say, a slight negative pressure is created below the diaphragm 24. This negative pressure can be created because of the fact that the flutter valve 138 acts as a check valve and prevents intake of outside atmosphere when the subject starts to inhale.

When the before mentioned slight negative pressure is created in chamber 26, the added force applied to the diaphragm in a direction to bring it to its lowermost position is sufficient with the spring 56 to overcome the force of springs 69 and the arms 67 and 68 are brought past dead center, with the result that the toggle switch snaps to the position shown in full lines in Fig. 12. This action of the toggle switch opens valve 93 which, in turn, admits oxygen under pressure to chamber 114, opens the main valve 98 and also admits oxygen to the expiratory valve control line, all as previously described, to cause a flow of expanded oxygen to and through chamber 26 and ultimately to the mask A while at the same time forcing valve 148 against the seat 134.

At times it is desirable to operate the apparatus as a demand positive pressure regulator wherein the peak pressure developed in chamber 26 is definitely above ambient. There may be various reasons for operating the apparatus as a demand positive pressure regulator, but I shall illustrate by reference to altitude. It is the pressure of oxygen within the lungs, that is to say, the so-called alveolar oxygen pressure, which determines whether or not oxygen will be absorbed and, if it will, the rate of absorption. As an illustration, the oxygen pressure at sea level is about 159 mm., this being due to the fact that only 21% of the atmospheric pressure of 760 mm. at sea level comprises pressure of oxygen. As altitude is gained, the oxygen pressure is decreased and this may be compensated for by admixing oxygen with air up to approximately 30,000 feet, at which altitude it is generally customary to start the use of pure oxygen. It has been found, as a practical proposition, that above about 38,000 to 40,000 feet pure oxygen at atmospheric pressure is insufficient. At 40,000 feet, for example, the total pressure of the atmosphere is such that, even if pure oxygen were delivered, the actual pressure of oxygen would be much less than at sea level. If the pure oxygen is delivered under positive pressure, then the total pressure of oxygen may be brought up to approximately that at sea level (or definitely higher if desired). While the apparatus of my present invention may be constructed in various ways, I have found that the spring 38 may be kept out of contact with the diaphragm entirely below about 30,000 feet. Above 30,000 feet, and as altitude is gained, the spring 38 may be gradually lowered in order to increase the peak pressure in the chamber 26. A high altitude is not essential for the apparatus to operate as a demand positive pressure regulator, but operation in a rarefied atmosphere affords at least one instance where the apparatus is required to deliver oxygen at positive pressure as it is being operated in response to demand of the user.

To understand the functioning of the apparatus when it is operated as a demand positive pressure regulator, let it be assumed that spring 38 is adjusted to some intermediate position at which its lowermost coil is engaged by the diaphragm 24 before the diaphragm 24 reaches its uppermost position. The apparatus will then operate in the following manner:

When the relay and main valves have been opened, oxygen is admitted through the expansion orifice 122 to expansion chamber 26 and at the same time to the expiratory valve regulator line to force valve 148 against seat 134. When oxygen first enters the chamber 26, the expansion orifice has its maximum cross sectional area and there is a quick surge of oxygen toward the mask of the user. As soon as the chamber 26 starts to become filled with oxygen, the first or immediate demands of the user being satisfied, the diaphragm 24 and associated parts are raised slightly to decrease the cross sectional area of the expansion orifice 122. Generally speaking, the first movement of the diaphragm will take it up into engagement with the spring 38. There will then be a continued flow of oxygen until a peak pressure is reached, determined by several factors, including the total oxygen intake of the user, time, the action of spring 56 and the adjustment of spring 38. When the peak pressure is reached, the toggle switch mechanism operates to cut off further flow of oxygen and to permit opening of the expiratory valve. The user has received oxygen under a pressure greater than ambient pressure, but at the end of the inhalation cycle he exhales, not against the positive pressure developed in the mask A, but to atmosphere through a restricted orifice, the area of which is determined by the adjustment of valve 142. When he has exhaled, the inhalation portion of the cycle again is not initiated until the user demands oxygen. When he makes his first movement to inhale, a slight negative pressure is created, exactly in the same manner as when the apparatus operates as a simple demand regulator, and the inhalation portion of the cycle is resumed as previously described.

In the operation as described hereinabove, it was assumed in each instance that the apparatus was being operated on the demand principle. In order to operate the device as a resuscitator, the control cap 61 is moved to its lowermost position so as to increase the compression of spring 56. It will be recalled that spring 56 normally is not quite strong enough to overcome springs 69 and that until the user demands oxygen by starting to inhale and thereby creates a slight negative pressure in chamber 26, the toggle switch will not operate and the inhalation portion of the breathing cycle will not be initiated. When, however, spring 56 is further compressed by the lowering of plunger 58, it then has sufficient power to overcome the force of springs 69 and return the diaphragm, even though a negative pressure is not created in the chamber 26 by the user starting to inhale. When the pressure of chamber 26 is lowered to approximately ambient pressure, therefore, the diaphragm is returned by spring 56 and the inhalation portion of the cycle is initiated automatically. Conversely, when the peak pressure is attained, oxygen delivery ceases and the expiratory valve is opened. The muscle tonus of the user, or patient, will cause a substantial portion of the lung contents to be expelled when the expiratory valve is opened; while the delivery of oxygen under some pressure (determined by adjustment of spring 38 plus the compression of spring 56) will assure delivery of enough oxygen to maintain life. A user of the apparatus may himself adjust it for automatic operation, or it may be adjusted by another. For example, if a member of a bomber crew should be wounded and loses consciousness, a fellow member can quickly adjust his oxygen apparatus to automatic operation.

As was previously noted, the user of the apparatus exhales against a restricted orifice, the cross sectional area of which is determined by the position of the adjustment valve 142. Generally speaking, the orifice 141 is restricted at high elevations and increased at lower elevations, but circumstances may dictate an adjustment of the valve 142 other than merely in response to change in elevation. The dial 147 may, therefore, be calibrated in thousands of feet elevation, or the equivalent thereof, or in other values, depending upon the results required at a given time. Generally speaking, it is desirable to have a high average or mean pressure of oxygen during as much of the breathing cycle as possible, it having been established that the absorption of oxygen by the blood is dependent not only upon alveolar pressure but also upon the average amount of time that that pressure exists. The apparatus of my present invention can be operated so that the inhalation portion of the cycle is relatively short and the lungs are filled rather quickly with oxygen or so that the expiratory cycle is relatively long and the exhalation curve formed by plotting pressure against time is relatively flat on top. The apparatus can be adjusted to various breathing cycles as expressed by curves showing inspiration and expiration against time.

In order to permit rapid release of spent oxygen by the user of the apparatus, the auxiliary valve 182 is provided and I would like now to describe the manner in which this particular valve functions. It is used to permit escape of oxygen at a definite pressure above the peak pressure which will be developed in the chamber 124. The manner in which this is accomplished is as follows: When there is no pressure in chamber 124 and diaphragm 192 is in the position shown in Figs. 4 and 6, valve 182 will be held on its seat by spring 188 but only at a slight pressure. When the valve 148 is closed, however, and oxygen pressure is developed in chamber 124, a pressure is created on the inside surface of diaphragm 192 and there is a tendency to pull the auxiliary valve stem 189 in a direction to produce a greater tension in spring 188. Normally the cam 196 engages the surface of the auxiliary valve stem 189, however, with sufficient braking action to prevent the shaft from being moved in either direction. When the valve stem 149 is moved fully to the left (looking at Figs. 4 and 5) a sufficient distance to engage the valve 148 against the seat 134, the cam operating pin 164 carried by the stem 149 strikes the finger 198 and rocks the entire assembly comprising the shaft 194, arm 197 and cam 196, to slightly disengage cam 196 from the surface of the auxiliary valve stem 189. The auxiliary valve stem 189 is now free to move in its guide and the pressure generated in chamber 124 will cause a corresponding flattening out of the auxiliary valve operating diaphragm 192. It will be recalled that the pressure developed in chamber 124 is determined by the adjustment of arm 48 controlling the position of spring 38 and generally will be in response to change in ambient pressure resulting from change in altitude when the device is used in aircraft. Assuming, for example, that the adjustment is sufficient to produce a gas pressure of 10 mm. of mercury, a pressure generally equivalent to 10 mm. of mercury will be applied against the inside surface of diaphragm 192 and a corresponding increased tension built up in spring 188. As long as the valve 148 is closed, the parts including the diaphragm 192, auxiliary valve stem 189 and spring 188 will remain in the position to which they have been moved by the increased pressure in chamber 124. As soon as valve stem 149 starts to move in a direction to open the valve 148, the cam operating pin 164 strikes finger 199 and rocks the cam arm 197 to cause the cam 196 to engage the valve stem 189 and hold the parts in the position which they reached as the pressure in chamber 124 was raised. When the atmosphere in the chamber 124 has been exhausted, however, and the pressure in diaphragm chamber 159 again built up so that the valve stem 149 moves in a left hand direction, the auxiliary valve stem 189 is again released and the tension of spring 188 can again be automatically adjusted in the manner previously described. It should be remembered that the position of the fingers 198 and 199 does not remain fixed and, therefore, the position at which they are engaged and disengaged by the cam operating pin 164 changes. The result of this automatic adjustment of the tension with which valve 182 engages its seat is that the user is always able to exhale against the auxiliary valve 182 by exerting a pressure through the act of exhaling which is a fixed slight value above the maximum pressure at any particular adjustment. If, at any time, therefore, the user wishes to exhale, he may do so. If the user of the apparatus expels the contents of his lungs in the manner permitted by the emergency valve arrangement, the shape of the breathing curve is entirely changed.

When the apparatus of my invention is used as a continuous positive pressure regulator, exhalation takes place against a fixed positive pressure or back pressure. This manner of operation may be brought about by entirely closing the orifice 141 with the adjustment valve 142. When the expiratory valve is adjusted in this manner, then exhalation takes place through the emergency valve only. The exhalation takes place against a pressure determined by the adjustment of spring 188, but inhalation takes place more or less the same as previously described. The spring 38 being adjusted to determine the peak pressure developed on inhalation, oxygen is delivered to chamber 26 and thence to the mask until the pressure in the chamber 26 reaches the said peak pressure. The reaching of this maximum pressure is determined by the amount of oxygen entering the chamber 26 and also by the amount of oxygen which the user takes into his lungs. When this pressure has been reached the switch comprising the toggle arms 67 and 68 is operated and the admission of further oxygen is discontinued exactly in accordance with the operations as previously described. The tension of spring 188 will also have been increased in proportion to the maximum pressure in chamber 26, and notwithstanding the fact that valve 148 may be entirely opened there will be no loss of oxygen from the chamber 26 because valve 142 has been closed as postulated, and valve 182 is still held to its seat at a pressure slightly above the pressure in chamber 124. By exhaling against the positive pressure in the chamber 124, tube 132 and mask A, the user of the apparatus can expel the contents of his lungs, the valve 182 being forced from its seat sufficiently to pass substantially the volume of gas which the user of the apparatus has forced from his lungs. As soon now as the user discontinues exhalation and makes an effort to inhale, the pressure in the chamber 26 will be lowered sufficiently to permit actuation again of the oxygen valves and the admission of a fresh supply of oxygen to the chamber 26 and thence to the mask. When the apparatus is used in this manner, it is necessary for the user either to exhale a large portion of the total gas content of the system (including his lungs) or to cause considerable decrease of pressure on inhalation, in order to operate the toggle mechanism and obtain a fresh supply of oxygen. There will never be a time when continuous negative pressure is required to obtain oxygen since as soon as oxygen starts to flow, it continues under pressure until the peak pressure is attained. Expedients for further loading the diaphragm to facilitate return of oxygen flow even when the pressure thereof at the end of exhalation remains relatively high may be employed. In the embodiment of the invention disclosed, the increased compression of spring 56 produced by manipulating the plunger 58 is such an expedient.

There are several additional features of my invention which have not been fully discussed. Among such features are the ease with which the user of the apparatus may adjust himself thereto, this being due to the fact that, generally speaking, he is permitted to behave "breathwise" in approximately the same way in which he would behave if he were breathing normally at sea level. If the user should, for any reason, cease to inhale after starting to inhale, a peak pressure can be built up quickly and further delivery of oxygen will be discontinued. If, at any time, during the breathing cycle, he should wish suddenly to expel substantially all of the lung contents due to fright, for example, or because of sighing, or for any other reason, the auxiliary valve 182 will be unseated with the result that the user is not dependent solely on the restricted orifice 141. Even if the expiratory valve should be closed, the auxiliary valve can be forced open at any time by an explosive exhalation.

Substantially the same naturalness of breathing occurs during inhalation. The relatively large area of the expansion orifice 122 when oxygen first starts to flow into chamber 26 causes a rapid delivery of oxygen to the mask A at the start of the inspiratory portion of the breathing cycle. If the user of the apparatus breathes normally, the orifice 122 will be partly closed, and pressure will be built up relatively slowly, giving the user of the apparatus a normal amount of time to inhale. If after starting to inhale he should sudden take a deep breath, or if he should inhale large quantities of oxygen rapidly, as may occur if he is doing heavy work, the orifice 122 will remain fully open or, if partially closed, will be opened to its maximum area to provide quickly for the needed additional quantities of oxygen caused by the excessive demand therefor. At no time, can the user of the apparatus develop a negative pressure by deep breathing after the slight initial negative pressure created at the beginning of the inspiratory portion of the breathing cycle when the apparatus is being operated as a simple demand regulator or demand positive pressure regulator.

It is generally essential for breathing that a small amount of carbon dioxide be in the atmosphere which is inhaled, and this is provided for in the apparatus of my invention. The tube 132 can be made any length desired and is removable for replacement by a longer or shorter tube to control the amount of carbon dioxide which will be dispersed in the inhaled atmosphere. In hospital work, it is sometimes desired to control accurately the amount of carbon dioxide which the patient inhales and this may readily be done with the apparatus of my invention. It is obvious that the expiratory valve can be placed directly in the mask, if desired, at the point where the tube 132 connects therewith; or the tube 132 may be made relatively long if a large amount of carbon dioxide is desired in the atmosphere as taken into the lungs. The apparatus of my present invention can be used to advantage for many types of treatment, for example, to provide a patient with a mixture of gases other than oxygen and nitrogen, such as a mixture of oxygen and helium for the purpose of combating certain types of asthmatic conditions.

It should be clear that while the apparatus of my present invention is advantageous for supplying oxygen in sustaining amounts and pressures to aviators and the like—and the invention is particularly adapted for such use in the embodiment shown in the drawings—my invention has other utilities in the oxygen therapy and related fields.

It must not be assumed from the description of the manner in which the apparatus of my present invention may be operated, that it is required to be operated in any particular manner. Its big advantage is that it lends itself to any type of control or operation found desirable under various conditions, such as combat conditions in airplanes. I wish to point out, for example, that, generally speaking, the restricted expiratory orifice will have a smaller area at high elevations than at relatively lower elevations. Since as a general rule it is more comfortable to exhale through some restriction than directly to low pressure atmosphere, the area of the orifice 141 will be controlled to suit the comfort of the user. It may be found that some advantage is obtained by utilizing an expiratory orifice of a size not favoring maximum comfort, in which event, by sacrificing the comfort of the user to some extent such additional advantage may be obtained. This general situation, as explained, with respect to the expiratory valve, may be true as to all adjustments including, for example, the peak pressure control. The apparatus of my present invention can be adjusted entirely by hand at the will of the operator or user thereof, but it may be operated automatically in response to a pressure or the like.

For the benefit of those skilled in the art, I wish to point out a typical manner in which the apparatus of my invention may be employed in an airplane. A combat pilot starts from the ground with the oxygen mask in position but without having the expiratory valve connected thereto. At 10,000 feet, the expiratory valve is connected to the mask and the pilot starts to breath therethrough. A mixture of oxygen and air is delivered under pressure through pipe 16 and the proportion of oxygen is gradually increased by means known in the art, until at 30,000 feet pure oxygen is being delivered. From 10,000 to about 30,000 feet the device operates as a simple demand regulator but with varying oxygen content in the incoming atmosphere. At a determined point above 30,000 feet (and at least by the time a 38,000 foot altitude is reached) the peak pressure is increased to cause the device to operate as a demand positive pressure regulator. The peak pressure is increased gradually as altitude is gained, and the pilot can safely rise to 50,000 feet or higher, if his equipment will take him there, and the apparatus supplies oxygen at sufficient pressure to permit the pilot to do useful work at the elevation reached. The pilot is not required at any time to exhale continuously against a positive back pressure, nor to strain himself to obtain sufficient oxygen to maintain adequate oxygen balance in the blood. The orifice 141 is gradually restricted as altitude is gained. The control of the adjusting handles 48 and 144 is in response to elevation. The device may be operated so that as the pilot climbs rapidly or loses altitude rapidly, as in a dive, there is an automatic compensation of oxygen pressure, so that he can entirely forget his oxygen equipment without danger of anoxemia. The pilot can himself adjust the device to operate as a resuscitator but, generally speaking, such adjustment is more apt to occur where there are a number of men in a crew and the adjustment is used by one to meet an emergency encountered by another.

The operation of the mechanism is, in part, illustrated by reference to curves such as shown in Figs. 13–16, inclusive. It should be understood with respect to all of these curves that none of them is intended to show oxygen flow but only the relationship between pressure and time. Those skilled in the art will understand that it is possible to have a condition in which two curves showing the breathing cycle would be identical in every respect but in which the actual volume of oxygen flow would be different. The actual shape of the curves may vary but, in general, they will have the features and salient configuration aspects illustrated in the drawings.

Referring now first to Fig. 13, the two curves there shown represent two breathing cycles in which the subject is at rest, in which the respiration is normal and in which the mechanism is adjusted to operate on the simple demand principle, that is to say, in which a slight inspiratory effort on the part of the subject is required to initiate oxygen flow and in which the peak pressure at which oxygen flow is discontinued is only slightly above ambient. The drawings show this peak pressure as one and one-half inches of water, low enough so that, for all practical purposes, the device is operating substantially at ambient pressure but high enough so that positive operation of the valve mechanism is assured. In Fig. 13, the horizontal ordinate is marked with numerals to identify seconds while the vertical axis is marked with divisions to indicate pressure. It will be noted that zero pressure is indicated by a dotted line and, for convenience only, the pressure is marked on a line corresponding to minus two inches of water. In the curve, the numeral 210 identifies the point of slight negative pressure caused by the subject starting to inhale. At this point, the diaphragm 24 and associated parts are in the position shown in Fig. 12 and at the beginning of this period no oxygen is flowing. Just at the start of the period indicated by the portion of the curve 210, the diaphragm 24 is almost to its lowermost position, in other words, at a point almost low enough to operate the over-center mechanism comprising the toggle arms 67 and 68. When the slightly negative pressure is established, desirably corresponding to one-fourth of an inch of water, as indicated in the drawing, the toggle arms move to establish the position shown in full lines in Fig. 12, thereby opening valve 93, actuating diaphragm 106 and admitting oxygen from the high pressure chamber through the passageways provided to the now fully open expansion orifice 122. The oxygen then flows quickly and starts to build up a pressure in the mask through chamber 26. During this period, the subject is inhaling and, while there is a tendency for the pressure to be compensated for by inhalation of oxygen, the fact that the expansion orifice provides for a quick surge of oxygen results in relatively rapid increase of pressure. This period is indicated by that portion of the curve marked with the numeral 211. Those skilled in the art will understand that by modifying the proportions of the expansion orifice the line 211 could be made to rise more sharply or less sharply. During that part of the curve marked with numeral 212, the diaphragm 24 has risen partially and the expansion orifice 122 has been decreased in cross section due to the fact that valve 118 has been raised to partially close the orifice 122. Thus, the pressure is permitted to increase somewhat gradually notwithstanding the fact that there is a decrease in oxygen intake. This part of the curve can also be influenced by modification in the shape and size of the orifice.

When the pressure reaches a peak 213, in this instance shown at one and one-half inches of water, the diaphragm 24 is raised sufficiently to cause the toggle mechanism to snap to the dotted line position of Fig. 12 and cut off further flow of oxygen. At the same time, high pressure oxygen is delivered to the expiratory valve B through tube 177 and valve 148 is opened. The peak 213 is shown slightly flat, indicating a brief period of unchanged pressure, this feature being a function of the design and is not influenced by the breathing habits of the subject. The line 214 indicates that exhalation is uniform, being controlled mainly by lung tissue recoil. The numeral 216 identifies the normal resting period between respirations shown as comprising slightly more than one-half minute but differing somewhat from subject to subject and from time to time. The length of this period is not influenced by design features.

In connection with the above, it should be pointed out that the cycle is initiated by the subject and will follow any rate of human respiration. In the drawings, a respiratory rate of approximately twelve cycles per minute is indicated. This is relatively slow and may, of course, vary but is not unusual when the oxygen intake is increased and the subject is at complete rest. The peak pressure of one and one-half inches may be varied but is close enough to or below the normal resting pulmonic recoil pressure of about one-half inch of water during resting respiration and, for this reason, will not cause respiratory fatigue and will only slightly, if at all, cause the subject to be conscious of his breathing. The period of negative pressure is so short and of such a minimum value that it is substantially effortless and has very little effect on producing respiratory fatigue and permits the patient to breathe essentially unconsciously. Normal inspiratory negativity measured at the nostril is between approximately one-half inch and one inch of water so that the negative pressure indicated is substantially normal.

Those skilled in the art will understand that slight variations in the equipment, in adjustment of the mechanism and the like may introduce some slight variations in the curves. The portion 214 of the curve follows normal expiratory experience and assumes normal lung tissue recoil against substantially a normal ambient pressure. As already pointed out, the valve 142 is controllable to reduce the expiratory orifice when ambient pressure substantially lower than sea level pressures are encountered. For this reason the shape of portion 214 of the curve may vary depending upon ambient pressure and/or the adjustment of the expiratory valve. The entire curve cycle can shape itself to normal expiratory experience, since it will naturally adjust itself to the subject's expiratory rate, the capacity on inhalation responds to the subject's needs and such incidents as coughing, sighing, etc. are substantially as normal as in ordinary natural breathing. Clearly, also, the subject can converse without difficulty, due to this obvious and natural adaptability of the device.

Now referring to Fig. 14, two curves are shown indicated generally by the reference characters 217 and 218, the former illustrating a typical breathing cycle when the device is operated on the simple demand principle and the subject is performing a moderate amount of work; and the latter a breathing cycle under the same conditions except that the subject is engaged in the performance of excessive work. The two curves are, for convenience, placed in juxtaposition but it is understood that, normally, successive breathing cycles, having the pattern shown, would not occur in immediate succession but there would be a number of cycles for transition from the condition of moderate work to excessive work.

When the subject is working, more oxygen is consumed than when the subject is at rest. The increased amount is delivered to him on demand. The principal differences between the condition of moderate work and excessive work are greater respiratory exchange in the latter case, the consumption of more oxygen (increased volume may modify the pressure curve only slightly), and more rapid or explosive exhalation.

In the case of moderate work, as shown by the curve 217, the incidence of trip negatively, as indicated at the point 219, is the same as when the subject is at rest. During the initial inhalation period 221, the oxygen is flowing rapidly and as long as this period is sustained the oxygen continues to flow rapidly and the lungs continue to fill at an accelerated rate. Initially, the orifice 122 is entirely open but starts to partially close near the end of this period, hence decreases its cross sectional area and admits oxygen less rapidly. The closing occurs later than in the case of complete rest because of the rapid inhalation of the subject. The lungs are filled at a lower pressure than in the resting state and since the lungs begin to reach their capacity at the low pressure and at a rapid rate but with a greater volume intake, the time covered by the portion of the curve 221 representing the period of more active inhalation is greater than the portion identified by the section 222 during which time the period of pressure rise is much shorter and the intra-pulmonic pressure builds up more rapidly to the peak pressure 223, one and one-half inches of water as in the previous instance and in accordance with the conditions postulated. The period 224 remains substantially the same as in the resting state except that the accessory muscles may modify the curve slightly. The curve, however, may remain substantially the same but it is to be borne in mind that there will usually be a greater volume of exhalation than when the subject is at rest. The straight line 226 indicates the normal pause between cycles shown here relatively shorter and, for convenience connected to the curve showing a breathing cycle when excessive work is performed.

In the second curve, the period of negative pressure, as indicated at 227, to trip the mechanism and start oxygen flow, is substantially the same as in the two previously described conditions. When the oxygen stars to flow, the expansion valve is entirely open, but the lungs remove the major portion of oxygen because of the urgent demand therefor, the period of slight negativity is somewhat prolonged and the period of maximum lung filling, as indicated at 228, is decreased. Thereafter, the oxygen pressure builds up rapidly as shown by the line 229 to reach an initial peak 231. There is a dwell at this point which is not under the control of or characteristic of the subject, but a function of the equipment. The initial peak 231, and dwell at such pressure, is, as in previously described conditions, at one and one-half inches of water. Due to the fact that the subject exhales rapidly when performing excessive work and also because of the increased amount of gas in his lungs, the regular expiratory orifice is inadequate and offers a resistance to exhalation. The accessory muscles and not merely lung tissue recoil play a part in exhalation under these circumstances, with the result that there is an increased intra-pulmonic pressure to a peak 232 corresponding to approximately two inches of water pressure. At this time the relief valve 182, which automatically sets to open at a pressure slightly above the initial peak pressure, is forced open and since much of the gas volume is eliminated at this time, there is an abrupt pressure fall along the line 232 followed by a gradual increase in expiration time along the line 233 to the end of the expiratory phase coinciding with the normal pause 234 between cycles. While the normal pause is determined by the characteristics of the subject, the time thereof is, in general, shorter directly proportionally to the amount of work being performed.

Fig. 16 shows a series of breathing curves illustrating characteristic cycles when the peak pressure is increased substantially above ambient, in which oxygen flow is initiated on demand of the subject and in which various conditions involving activity of the subject and adjustment of the apparatus are encountered. The chart comprising the figure is drawn on the same scale as the charts of Figs. 13 and 14 discussed hereinabove. For convenience, the several illustrative cycles are connected together but in actual operation there would necessarily be a gradual conversion from one set of conditions to the other.

The curves are repeated to show identical situations in each instance with, however, the peak pressure five inches of water in one case and fifteen inches of water in the other. Looking now first to the curves 236 and 237 showing, respectively, a peak of fifteen inches of water and five inches of water, the trip negativity remains the same as in previously postulated conditions and the period of initial active lung filling and gradual increase of pressure to the peak is substantially the same as in the other embodiments except that the actual pressure rise is greater. The peak pressure may be set at any reading from the normal peak of one and one-half inches to the maximum which the subject can stand without injury under the conditions of operation, the maximum normally thought to be about sixteen to twenty inches of water. In this case, also, there is a slight period of unchanged pressure at the top indicated by the slight flattening out of the curve, the duration of which may vary slightly due to design of the equipment. In the curves identified by the numerals 236 and 237, the subject is at rest and there is no appreciable expiratory resistance, that is to say, the valve 142 is substantially fully open so that exhalation is substantially directly to atmosphere. Exhalation is due to lung tissue recoil and the pressure drops relatively sharply and substantially in a straight line to the normal inspiratory pause shown by the horizontal line at zero pressure. In the next set of curves identified by the characters 238 and 239, the subject is at rest but exhales against an expiratory resistance caused by the partial closing of valve 142. The incidence of oxygen flow is substantially as described in previous embodiments and inhalation and development of the peak pressure follows the same patterns as in the curves 236 and 237. Due to the introduction of expiratory resistance, however, exhalation is prolonged and takes place at a varying rate so that the curve showing the expiratory phase of the cycle does not follow substantially a straight line as in the case illustrated by the curves 236 and 237. The exhalation curve 238a is characteristic of the introduction of only a relatively small amount of expiratory resistance, that is to say, in which the valve 142 is closed only slightly while the curve 238b is characteristic of the exhalation portion of the cycle when still greater expiratory resistance is introduced by further closing of the valve. Corresponding conditions are shown by the curves 239a and 239b at the lower pressure indicated. When the subject is resting and exhales through a partially closed orifice or other means providing for expiratory resistance, there is a normal pause at the beginning and end of each cycle.

Curves 241 and 242 are typical of the breathing cycle when moderate work is being performed and there is no expiratory resistance. It will be seen that the curves follow the curves 236 and 237 fairly well with the exception that the period of rapid lung filling when the expansion valve 122 is at or near the flood stage is increased. In other words, the conditions are comparable to those contrasted in the discussion of Figs. 13 and 14. The straight portion of the inspiratory portion of the cycle, in which the pressure is built up rapidly to the peak to which the apparatus is adjusted is the same as for the curves 236 and 237, but it should be borne in mind that these curves could have identical shape except that there would be greater oxygen flow due to the greater demand of the subject, since under the conditions discussed with respect to curves 241 and 242 the subject is exhaling without expiratory resistance, the expiratory portion of the cycle is substantially a straight line but, in any case, there is substantially a uniform rate of pressure loss to ambient pressure where there is a respiratory pause shown by the horizontal line.

The curves 243 and 244 represent conditions the same as the curves 241 and 242 except that the expiratory valve is adjusted to introduce a resistance to exhalation. The portions 243a and 243b, as well as the portions 244a and 244b, illustrate the pressure changes on exhalation corresponding generally to those associated with the curves 238 and 239 but modified slightly due to the fact that there is somewhat more gas being expelled from the lungs due to the fact that a moderate amount of work is being performed.

The curves 246 and 247 illustrate a typical breathing cycle when the subject is performing an excessive amount of work and the expiratory valve is not set to introduce added resistance. There is a greater demand for oxygen and lengthening out of the period of rapid oxygen intake at which the expansion valve is at or near flood stage but thereafter the pressure rise to the peak of fifteen inches and five inches of water, respectively, such as postulated, is rapid and follows substantially the pattern of the previously described cycles involving increased peak pressure. Exhalation during excessive work is such as to increase the intra-pulmonic pressure sharply with the result that there is a momentary sharp increase in pressure above the initial peak pressure followed by an opening of the valve 182 and a succeeding rapid loss of pressure along the lines 246a and 247a, respectively. Following the sharp drop in pressure, due to the opening and subsequent closing of the valve 182, there is a more gradual decrease in pressure indicated by the more gradual slope of the line identifying the expiratory phase. The pressure returns to zero or ambient pressure as in previously described embodiments and the respiratory pause is shorter.

The final set of curves of Fig. 16, 248 and 249, are typical of breathing cycles when excessive work is being performed and the expiratory valve is adjusted to increase expiratory resistance. The curves follow the outline of curves 246 and 247 up to the development of the peak pressure but thereafter there is a change due to the changed pattern of the expiratory phase. When the expiratory valve 142 is only partially closed, the expiratory portions of the curves follow the general outline as indicated by the lines 248a and 249a, respectively. It will be noted, that there is some flattening out of the maximum peak and a gradual loss of pressure during the beginning of exhalation due to the fact that the amount of gas which can pass through the expiratory valve during a given period is decreased. Some gas will escape through the valve 182, to be sure, but this valve is unseated only momentarily and immediately closes when the pressure has been reduced only slightly. The pressure curve on exhalation thereafter follows the general outline shown. When the expiratory valve is still further closed, the expiratory phase of the cycle is still further lengthened, as indicated by the curves 248b and 249b.

Reference may now be had to Fig. 15, showing typical breathing cycles involving varying conditions, each, however, assuming that the subject is not breathing voluntarily and the mechanism is adjusted to function automatically. This means that there is an additional loading of the diaphragm 24 by manipulation of control cap 61 (Fig. 12), that the toggle mechanism will function to initiate oxygen flow when the pressure in chamber 26 is still slightly above ambient pressure. The mechanism can be adjusted to trip and initiate oxygen flow at a positive pressure of one-half inch of water. In the identical curves indicated by the references 251, flow of oxygen is started at one-half inch positive pressure, and the period of lung filling and rising pulmonic pressure shown by the initial portion of the curves, coincide until a peak pressure, shown in these curves as corresponding to seven inches of water, is reached. At this point, the mechanism trips to discontinue oxygen flow and there is a loss of pressure at a substantially uniform rate controlled by normal lung tissue recoil to a minimum pressure at which the cycle is again initiated by automatic tripping of the mechanism and re-introduction of oxygen. At the beginning of the cycle, the expansion orifice 122 is fully open as in the condition on demand, and, depending upon exact dimensioning of parts and conditions, including lung capacity of the subject, there may be some modification in the beginning portion of the curve. The actual pressure may not be a straight line from minimum to maximum points, but has been indicated as a straight line to show that the rise is gradual and substantially uniform, being due entirely to increased volume of gas introduced and is not modified by active voluntary inhalation on the part of the subject. In curves 252 and 253, the peak pressure has been increased to fifteen inches and eight inches, respectively. As indicated by the position of the apex showing the peak pressure, variations from curves 251 relate substantially only to the maximum pressure attained, but the shape of the curves otherwise follow that described in connection with curves 251.

In the curves 254 and 256, the peak pressures are also adjusted to fifteen inches and eight inches, respectively, but introduction of expiratory resistance extends the period of exhalation, thereby slowing down the expiration time and causing a higher mean pressure to exist during a given cycle. The numerals 254a and 256a indicate characteristic shapes of the expiratory portion of the curve with the introduction of only a portion of the resistance permissible by the adjustment of the expiratory valve. The lines 254b and 256b, respectively show the pressure-time relation when a still greater expiratory resistance is introduced.

What I claim as new and desire to protect by Letters Patent of the United States is:

1. In an oxygen administration system, of the character described, an expiratory valve mechanism, comprising a casing forming a valve seat, a valve engageable against said seat, a diaphragm responsive to pressure within the casing to force said valve against said seat, a second valve seat, a valve, spring means pulling said valve to its seat, and means responsive to pressure within the casing for loading said spring above the pressure effective against said diaphragm, whereby said last mentioned valve may be forced from its seat at a pressure slightly above the pressure closing the first mentioned valve.

2. In an oxygen administration system, a regulator including a casing forming a low pressure oxygen chamber and a high pressure oxygen chamber, a diaphragm having one side in contact with said low pressure chamber, an overcenter switch operated by movement of said diaphragm, a control valve operated by said switch, a second diaphragm having a chamber on one side thereof, a main valve operated by said second diaphragm, a passageway leading from said high pressure chamber to said diaphragm chamber, said passageway being opened by said control valve, a second passageway between said high pressure chamber and low pressure chamber controlled by the said main valve, the relationship of the parts being such that movement of the first mentioned diaphragm in response to a minimum and a maximum pressure will close or open said control valve and the second mentioned diaphragm will thereby close or open the said main valve to cut off the flow of oxygen, or deliver oxygen to said low pressure chamber, a normally open expiratory valve, pressure responsive mechanism for closing the same, and a passageway leading from said main valve passageway to said mechanism for closing the expiratory valve when the oxygen is flowing from the said high pressure chamber to the said low pressure chamber.

3. Oxygen regulating apparatus of the character described, including an oxygen delivery line, a mask in connection with said line, a diaphragm, one side of which is in communication with said line, a valve for controlling delivery of oxygen to said line, overcenter switch mechanism responsive to position of the diaphragm for operating said valve, means for loading said diaphragm just short of the point required to operate said switch mechanism to open said valve, whereby slight negative pressure in the said delivery line is adequate to operate said switch mechanism, open the valve and deliver oxygen to said line, additional spring loading means engageable by the diaphragm for controlling the peak pressure in the delivery line required to move the diaphragm to a position to operate the switch mechanism and open the said valve mechanism, an expiratory valve opening said mask to atmosphere, a valve closing the said opening but operating in response to attainment of a peak pressure in the said delivery line to open said mask to atmosphere, and an auxiliary spring pressed expiratory valve in said line adapted to be forced from its seat to permit exhalation at a pressure above said peak pressure.

4. In an oxygen feeding system wherein oxygen is delivered to a mask on demand and discontinued on attainment of a peak pressure, an expiratory valve mechanism in communication with the said mask, an auxiliary release valve, a spring urging said release valve to its seat, a diaphragm subjected to pressure within the mask and a connection between said diaphragm and release valve, the construction and operation of said diaphragm and release valve being such that the said release valve may be forced from its seat by the development of a pressure within said mask only slightly above said peak pressure.

5. In an oxygen feeding system wherein oxygen is delivered to a mask on demand and discontinued on attainment of a peak pressure, an expiratory valve mechanism in communication with said mask, an auxiliary release valve, a spring urging said release valve to its seat, a diaphragm subjected to pressure within the mask and a connection between said diaphragm and release valve, the construction and operation of said diaphragm and release valve being such that the said release valve may be forced from its seat by the development of a pressure within said mask only slightly above said peak pressure, said expiratory valve mechanism including an expiratory valve normally opened in response to development of said peak pressure, and means for retaining the loading of said release valve spring when said expiratory valve is opened.

6. In an oxygen feeding system wherein oxygen is delivered to a mask on demand and discontinued on attainment of a peak pressure, an expiratory valve mechanism in communication with said mask, an auxiliary release valve, a spring urging said release valve to its seat, a diaphragm subjected to pressure within the mask and a connection between said diaphragm and release valve, the construction and operation of said diaphragm and release valve being such that the said release valve may be forced from its seat by the development of a pressure within said mask only slightly above said peak pressure, said expiratory valve mechanism including an expiratory valve normally opened in response to development of said peak pressure, and means for retaining the loading of said release valve spring when said expiratory valve is opened, said means including a cam actuated by said expiratory valve and engageable against said connection between said release valve spring and diaphragm, said cam moving to hold the said connection and maintain spring tension of said release valve spring when said expiratory valve is opened.

7. In an oxygen feeding system, the combination of a mask, an oxygen flow control device responsive to slight negative pressure to deliver oxygen from a source to said mask and responsive to a controllable peak pressure to arrest such delivery, of a vent valve structure including an expiratory orifice and overload release orifice, a valve closing said expiratory orifice during oxygen flow to the mask, but responsive to said peak pressure to uncover said expiratory orifice, and a release valve spring held against said peak pressure to close said release orifice, said release valve adapted to be forced from its seat at a pressure above said peak pressure.

8. In an oxygen feeding system, the combination of a mask, an oxygen flow control device responsive to slight negative pressure to deliver oxygen from a source to said mask and responsive to a controllable peak pressure to arrest such delivery, of a vent valve structure including an expiratory orifice and overload release orifice, a valve closing said expiratory orifice during oxygen flow to the mask, but responsive to said peak pressure to uncover said expiratory orifice, a release valve spring held against said peak pressure to close said release orifice, said release valve adapted to be forced from its seat at a pressure above said peak pressure and means for controlling flow of gaseous fluid through said expiratory orifice whereby to introduce expiratory resistance.

9. In an oxygen feeding system, the combination of a mask, an oxygen flow control device responsive to slight negative pressure to deliver oxygen from a source to said mask and responsive to a controllable peak pressure to arrest such delivery, of a vent valve structure including an expiratory orifice and overload release orifice, a valve closing said expiratory orifice during oxygen flow to the mask, but responsive to said peak pressure to uncover said expiratory orifice, a release valve spring held against said peak pressure to close said release orifice, said release valve adapted to be forced from its seat at a pressure above said peak pressure and means for controlling flow of gaseous fluid through said expiratory orifice whereby to introduce expiratory resistance, said means functioning to prevent entirely flow of gaseous fluid through said expiratory orifice so that expiration is entirely through said release orifice.

10. In an oxygen feeding system, the combination of a mask, an oxygen flow control device responsive to slight negative pressure to deliver oxygen from a source to said mask and responsive to a controllable peak pressure to arrest such delivery, of a vent valve structure including an expiratory orifice and overload release orifice, a valve closing said expiratory orifice during oxygen flow to the mask, but responsive to said peak pressure to uncover said expiratory orifice, a release valve spring held against said peak pressure to close said release orifice, said release valve adapted to be forced from its seat at a pressure above said peak pressure, said combination including a delivery line between said oxygen flow control device and said mask, said vent valve structure comprising a casing having two orifices connected into said line near the mask, whereby oxygen flowing to said mask and gaseous material expelled from the lungs will both pass through said vent valve casing.

11. Apparatus for controlling flow of oxygen in an oxygen feeding system, comprising a valve structure having a casing with a low pressure chamber communicating with an outlet side of the valve, a diaphragm defining one side of said chamber, an overcenter spring loaded toggle switch mechanism disposed in the said low pressure chamber, a high pressure chamber in the casing comunicating with a source of oxygen, a connection between said toggle switch mechanism and diaphragm whereby to operate the said switch mechanism in response to two extremes of positions of the diaphragm, a valve mechanism controlling flow of oxygen from said high pressure chamber to said low pressure chamber, and means including a relay toggle mechanism for actuating said valve mechanism from said toggle switch mechanism.

12. Apparatus for controlling flow of oxygen in an oxygen feeding system, comprising a valve structure having a casing with a low pressure chamber communicating with an outlet side of the valve, a diaphragm defining one side of said chamber, an overcenter spring loaded toggle switch mechanism disposed in the said low pressure chamber, a high pressure chamber in the casing communicating with a source of oxygen, a connection between said toggle switch mechanism and diaphragm whereby to operate the said switch mechanism in response to two extremes of positions of the diaphragm, a valve mechanism including a control valve, main valve, and main valve diaphragm control mechanism actuated by the said control valve for controlling flow of oxygen from said high pressure chamber to said low pressure chamber, and means including a relay toggle mechanism for actuating said valve mechanism from said toggle switch mechanism.

13. Apparatus for controlling flow of oxygen in an oxygen administration system comprising a casing having an inlet and outlet side, a high pressure chamber in communication with a source of oxygen at said inlet side, a low pressure chamber in communication with said outlet side, a diaphragm defining one side of said low pressure chamber, an expansion valve, a stem carrying said valve, said stem projecting through said diaphragm, a pair of toggle arms pivoted to said stem within the low pressure chamber, a spring between said toggle arms connected to cause them to snap to either side of a center position as an overcenter switch mechanism, one end of one such toggle arm being relatively fixed and one end of the second arm being free to move, a relay toggle arm pivoted intermediate its ends with one end having a loose connection to the said free end, a spring connected to said relay toggle arm to cause it to operate as an overcenter switch device, a control valve engaged by an arm of the relay toggle, a main valve diaphragm having an expansion chamber on one side thereof, a passageway between said expansion chamber and high pressure chamber controlled by said control valve, a main valve controlled by said main valve diaphragm, a passageway between said high pressure chamber and expansion valve controlled by said main valve, and a diaphragm return spring exterior of the low pressure chamber engaging said valve stem, the said return spring being just insufficient to overcome said toggle arm spring so that slight negative pressure within the low pressure chamber is required to operate the said toggle arm switch and open said valves to initiate oxygen flow, and pressure only slightly above ambient is sufficient to move said toggle arm switch in a reverse direction to discontinue oxygen flow through the expansion valve.

14. Apparatus for controlling flow of oxygen in an oxygen administration system comprising a casing having an inlet and outlet side, a high pressure chamber in communication with a source of oxygen at said inlet side, a low pressure chamber in communication with said outlet side, a diaphragm defining one side of said low pressure chamber, a variable orifice expansion valve, a stem carrying said valve, said stem projecting through said diaphragm, a pair of toggle arms pivoted to said stem within the low pressure chamber, a spring between said toggle arms connected to cause them to snap to either side of a center position as an overcenter switch mechanism, one end of one such toggle arm being relatively fixed and one end of the second arm being free to move, a relay toggle arm pivoted intermediate its ends with one end having a loose connection to the said free end, a spring connected to said relay toggle arm to cause it to operate as an overcenter switch device, a control valve engaged by an arm of the relay toggle, a main valve diaphragm having an expansion chamber on one side thereof, a passageway between said expansion chamber and high pressure chamber controlled by said control valve, a main valve controlled by said main valve diaphragm, a passageway between said high pressure chamber and expansion valve controlled by said main valve, and a diaphragm return spring exterior of the low pressure chamber engaging said valve stem, the said return spring being just insufficient to overcome said toggle arm spring so that slight negative pressure within the low pressure chamber is required to operate the said toggle arm switch and open said valves to initiate oxygen flow, and pressure only slightly above ambient is sufficient to move said toggle arm switch in a reverse direction to discontinue oxygen flow through the expansion valve, said variable orifice expansion valve functioning to permit an initial surge of oxygen with diminishing flow as the diaphragm is raised.

15. Apparatus for controlling flow of oxygen in an oxygen administration system comprising a casing having an inlet and outlet side, a high pressure chamber in communication with a source of oxygen at said inlet side, a low pressure chamber in communication with said outlet side, a diaphragm defining one side of said low pressure chamber, an expansion valve, a stem carrying said valve, said stem projecting through said diaphragm, a pair of toggle arms pivoted to said stem within the low pressure chamber, a spring between said toggle arms connected to cause them to snap to either side of a center position as an overcenter switch mechanism, one end of one such toggle arm being relatively fixed and one end of the second arm being free to move, a relay toggle arm pivoted intermediate its ends with one end having a loose connection to the said free end, a spring connected to said relay toggle arm to cause it to operate as an overcenter switch device, a control valve engaged by an arm of the relay toggle, a main valve diaphragm having an expansion chamber on one side thereof, a passageway between said expansion chamber and high pressure chamber controlled by said control valve, a main valve controlled by said main valve diaphragm, a passageway between said high pressure chamber and expansion valve controlled by said main valve, a diaphragm return spring exterior of the low pressure chamber engaging said valve stem, the said return spring being just insufficient to overcome said toggle arm spring so that slight negative pressure within the low pressure chamber is required to operate the said toggle arm switch and open said valves to initiate oxygen flow, and pressure only slightly above ambient is sufficient to move said toggle arm switch in a reverse direction to discontinue oxygen flow through the expansion valve, means in the casing forming a control line passageway, and means for connecting said control line passageway to the high pressure chamber when the oxygen is flowing to said low pressure chamber.

16. Apparatus for controlling flow of oxygen in an oxygen administration system comprising a casing having an inlet and outlet side, a high pressure chamber in communication with a source of oxygen at said inlet side, a low pressure chamber in communication with said outlet side, a diaphragm defining one side of said low pressure chamber, an expansion valve, a stem carrying said valve, said stem projecting through said diaphragm, a pair of toggle arms pivoted to said stem within the low pressure chamber, a spring between said toggle arms connected to cause them to snap to either side of a center position as an overcenter switch mechanism, one end of one such toggle arm being relatively fixed and one end of the second arm being free to move, a relay toggle arm pivoted intermediate its ends with one end having a loose connection to the said free end, a spring connected to said relay toggle arm to cause it to operate as an overcenter switch device, a control valve engaged by an arm of the relay toggle, a main valve diaphragm having an expansion chamber on one side thereof, a passageway between said expansion chamber and high pressure chamber controlled by said control valve, a main valve controlled by said main valve diaphragm, a passageway between said high pressure chamber and expansion valve controlled by said main valve, a diaphragm return spring exterior of the low pressure chamber engaging said valve stem, the said return spring being just insufficient to overcome said toggle arm spring so that slight negative pressure within the low pressure chamber is required to operate the said toggle arm switch and open said valves to initiate oxygen flow, and pressure only slightly above ambient is sufficient to move said toggle arm switch in a reverse direction to discontinue oxygen flow through the expansion valve, and means forming a control line passageway connected into the said passageway between the expansion valve and high pressure chamber.

17. Apparatus for controlling flow of oxygen in an oxygen administration system comprising a casing having an inlet and outlet side, a high pressure chamber in communication with a source of oxygen at said inlet side, a low pressure chamber in communication with said outlet side, a central diaphragm defining one side of said low pressure chamber, an expansion valve, a stem carrying said valve, said stem projecting through said diaphragm, a pair of toggle arms pivoted to said stem within the low pressure chamber, a spring between said toggle arms connected to cause them to snap to either side of a center position as an overcenter switch mechanism, one end of one such toggle arm being relatively fixed and one end of the second arm being free to move, a relay toggle arm pivoted intermediate its ends with one end having a loose connection to the said free end, a spring connected to said relay toggle arm to cause it to operate as an overcenter switch device, a control valve engaged by an arm of the relay toggle, a main valve diaphragm having an expansion chamber on one side thereof, a passageway between said expansion chamber and high pressure chamber controlled by said control valve, a main valve controlled by said main valve diaphragm, a passageway between said high pressure chamber and expansion valve controlled by said main valve, a diaphragm return spring exterior of the low pressure chamber engaging said valve stem, the said return spring being just insufficient to overcome said toggle arm spring so that slight pressure within the low pressure chamber is required to operate the said toggle arm switch and open said valves to initiate oxygen flow, and pressure only slightly above ambient is sufficient to move said toggle arm switch in a reverse direction to discontinue oxygen flow through the expansion valve, and spring means for additionally controllably loading said control diaphragm whereby to increase the peak pressure at which the oxygen flow is arrested at a predetermined controlled maximum above ambient.

18. Apparatus for controlling flow of oxygen in an oxygen administration system comprising a casing having an inlet and outlet side, a high pressure chamber in communication with a source of oxygen at said inlet side, a low pressure chamber in communication with said outlet side, a control diaphragm defining one side of said low pressure chamber, an expansion valve, a stem carrying said valve, said stem projecting through said diaphragm, a pair of toggle arms pivoted to said stem within the low pressure chamber, a spring between said toggle arms connected to cause them to snap to either side of a center position as an overcenter switch mechanism, one end of one such toggle arm being relatively fixed and one end of the second arm being free to move, a relay toggle arm pivoted intermediate its ends with one end having a loose connection to the said free end, a spring connected to said relay toggle arm to cause it to operate as an overcenter switch device, a control valve engaged by an arm of the relay toggle, a main valve diaphragm having an expansion chamber on one side thereof, a passageway between said expansion chamber and high pressure chamber controlled by said control valve, a main valve controlled by said main valve diaphragm, a passageway between said high pressure chamber and expansion valve controlled by said main valve, a diaphragm return spring exterior of the low pressure chamber engaging said valve stem, the said return spring being just insufficient to overcome said toggle arm spring so that slight negative pressure within the low pressure chamber is required to operate the said toggle arm switch and open said valves to initiate oxygen flow, and pressure only slightly above ambient is sufficient to move said toggle arm switch in a reverse direction to discontinue oxygen flow through the expansion valve, a compression spring normally out of contact with the diaphragm, and means for moving said spring in a direction toward contact with the diaphragm whereby to additionally load the said control diaphragm, at least in the latter part of its movement, and thereby to increase the pressure in the low pressure chamber at which the overcenter switch mechanism operates to arrest further oxygen flow.

19. Apparatus for controlling flow of oxygen in an oxygen administration system comprising a casing having an inlet and outlet side, a high pressure chamber in communication with a source of oxygen at said inlet side, a low pressure chamber in communication with said outlet side, a control diaphragm defining one side of said low pressure chamber, an expansion valve, a stem carrying said valve, said stem projecting through said diaphragm, a pair of toggle arms pivoted to said stem within the low pressure chamber, a spring between said toggle arms connected to cause them to snap to either side of a center position as an overcenter switch mechanism, one end of one such toggle arm being relatively fixed and one end of the second arm being free to move, a relay toggle arm pivoted intermediate its ends with one end having a loose connection to the said free end, a spring connected to said relay toggle arm to cause it to operate as an overcenter switch device, a control valve engaged by an arm of the relay toggle, a main valve diaphragm having an expansion chamber on one side thereof, a passageway between said expansion chamber and high pressure chamber controlled by said control valve, a main valve controlled by said main valve diaphragm, a passageway between said high pressure chamber and expansion valve controlled by said main valve, a diaphragm return spring exterior of the low pressure chamber engaging said valve stem, the said return spring being just insufficient to overcome said toggle arm spring so that slight negative pressure within the low pressure chamber is required to operate the said toggle arm switch and open said valves to initiate oxygen flow, and pressure only slightly above ambient is sufficient to move said toggle arm switch in a reverse direction to discontinue oxygen flow through the expansion valve, a compression spring normally out of contact with the diaphragm, and means for moving said spring in a direction toward contact with the diaphragm whereby to additionally load the said control diaphragm, at least in the latter part of its movement, and thereby to increase the pressure in the low pressure chamber at which the overcenter switch mechanism operates to arrest further oxygen flow, said compression spring being so constructed and arranged that it will not sufficiently add to the diaphragm load at its extreme lowermost position to operate the overcenter switch mechanism at ambient pressure to initiate oxygen flow.

20. Apparatus for controlling flow of oxygen in an oxygen administration system comprising a casing having an inlet and outlet side, a high pressure chamber in communication with a source of oxygen at said inlet side, a low pressure chamber in communication with said outlet side, a diaphragm defining one side of said low pressure chamber, an expansion valve, a stem carrying said valve, said stem projecting through said diaphragm, a pair of toggle arms pivoted to said stem within the low pressure chamber, a spring between said toggle arms connected to cause them to snap to either side of a center position as an overcenter switch mechanism, one end of one such toggle arm being relatively fixed and one end of the second arm being free to move, a relay toggle arm pivoted intermediate its ends with one end having a loose connection to the said free end, a spring connected to said relay toggle arm to cause it to operate as an overcenter switch device, a control valve engaged by an arm of the relay toggle, a main valve diaphragm having an expansion chamber on one side thereof, a passageway between said expansion chamber and high pressure chamber controlled by said control valve, a main valve controlled by said main valve diaphragm, a passageway between said high pressure chamber and expansion valve controlled by said main valve, and a diaphragm return spring exterior of the low pressure chamber engaging said valve stem, the said return spring being just insufficient to overcome said toggle arm spring so that slight negative pressure within the low pressure chamber is required to operate the said toggle arm switch and open said valves to initiate oxygen flow, and pressure only slightly above ambient is sufficient to move said toggle arm switch in a reverse direction to discontinue oxygen flow through the expansion valve and means for additionally loading said diaphragm return spring to cause the overcenter switch mechanism to actuate and initiate oxygen flow at a minimum positive pressure, whereby to cause the said valve mechanism to operate automatically as a resuscitator.

21. Apparatus as defined in claim 20, including a compression spring for additionally loading the said diaphragm to controllably increase the peak pressure in the low pressure chamber at which oxygen ceases to flow.

ALBERT E. McKEE.

REFERENCES CITED

The following references are of record in the file of this patent:

UNITED STATES PATENTS

| Number | Name | Date |
|---|---|---|
| 311,147 | Richardson | Jan. 20, 1885 |
| 558,730 | Johnson | Apr. 21, 1896 |
| 559,881 | Ahrens | May 12, 1896 |
| 703,687 | Warren | July 1, 1902 |
| 744,297 | Cook | Nov. 17, 1903 |
| 1,309,203 | Hopkins | July 8, 1919 |
| 1,320,451 | Dalen | Nov. 4, 1919 |
| 1,488,442 | Schroder | Mar. 25, 1924 |
| 1,953,433 | Replogle | Apr. 3, 1934 |
| 2,063,043 | McKesson | Dec. 8, 1936 |
| 2,121,311 | Anderson et al. | June 21, 1938 |
| 2,138,845 | Erikson | Dec. 6, 1938 |
| 2,223,570 | McMillin | Dec. 3, 1940 |
| 2,268,172 | Sinnett | Dec. 30, 1941 |
| 2,269,904 | Erickson | Jan. 13, 1942 |
| 2,288,436 | Cahan | June 30, 1942 |
| 2,310,022 | Heidbrink | Feb. 2, 1943 |
| 2,310,189 | Deming | Feb. 2, 1943 |
| 2,328,214 | Holmes | Aug. 31, 1943 |
| 2,376,348 | Fox | May 22, 1945 |
| 2,378,047 | Strange | June 12, 1945 |

FOREIGN PATENTS

| Number | Country | Date |
|---|---|---|
| 645,056 | Germany | May 20, 1937 |